(12) United States Patent
Yoshida

(10) Patent No.: US 8,395,744 B2
(45) Date of Patent: Mar. 12, 2013

(54) DISPLAY DEVICE INCLUDING DUMMY PIXEL REGION

(75) Inventor: Masahiro Yoshida, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 213 days.

(21) Appl. No.: 12/301,286

(22) PCT Filed: May 15, 2007

(86) PCT No.: PCT/JP2007/059933
§ 371 (c)(1),
(2), (4) Date: Nov. 18, 2008

(87) PCT Pub. No.: WO2007/135893
PCT Pub. Date: Nov. 29, 2007

(65) Prior Publication Data
US 2009/0231532 A1     Sep. 17, 2009

(30) Foreign Application Priority Data
May 19, 2006     (JP) .................................. 2006-140718

(51) Int. Cl.
*G02F 1/1345* (2006.01)
*G02F 1/1343* (2006.01)

(52) U.S. Cl. ............ 349/149; 349/39; 349/151; 349/152

(58) Field of Classification Search ................... 349/149, 349/39, 151–152
See application file for complete search history.

(56) References Cited

U.S. PATENT DOCUMENTS

| 2003/0063080 | A1 | 4/2003 | Takahashi et al. | |
|---|---|---|---|---|
| 2004/0012744 | A1* | 1/2004 | Ishige et al. | 349/139 |
| 2004/0032557 | A1 | 2/2004 | Lee et al. | |
| 2004/0105140 | A1* | 6/2004 | Fujita | 359/245 |
| 2005/0007526 | A1* | 1/2005 | Lim | 349/110 |
| 2005/0078240 | A1* | 4/2005 | Murade | 349/110 |
| 2005/0146646 | A1 | 7/2005 | Takeuchi et al. | |

(Continued)

FOREIGN PATENT DOCUMENTS

| JP | 05-323336 A | 12/1993 |
|---|---|---|
| JP | 09-005780 A | 1/1997 |

(Continued)

OTHER PUBLICATIONS

Official Communication issued in corresponding European Patent Application No. 07743368.8, mailed on Oct. 30, 2009.

(Continued)

*Primary Examiner* — Lauren Nguyen
(74) *Attorney, Agent, or Firm* — Keating & Bennett, LLP

(57) ABSTRACT

In an active matrix type display device having a drive circuit at one side of an active matrix substrate and feeding a common voltage Vcom to a counter substrate side via a common transfer, the area of a frame region is reduced without degrading the yield. A pixel region of the active matrix substrate includes an actual pixel region containing an effective pixel for performing a display in accordance with a data signal supplied by signal lines, and a dummy pixel region positioned at the panel end side as compared to the actual pixel region. At least a portion of a common wiring is arranged in the dummy pixel region of the pixel region to supply a common signal to common transfers arranged on a side facing the side of the active matrix substrate where a bus line drive circuit is arranged.

11 Claims, 18 Drawing Sheets

U.S. PATENT DOCUMENTS

2005/0225708 A1    10/2005    Oke et al.
2006/0017867 A1     1/2006    Kusafuka et al.
2006/0033872 A1*    2/2006    Sasuga et al. ............ 349/149

FOREIGN PATENT DOCUMENTS

| JP | 10-213816 A   | 8/1998 |
| JP | 11-084421 A   | 3/1999 |
| JP | 2001-33814 A  | 2/2001 |
| JP | 2003-216063 A | 7/2003 |
| JP | 2003-241217 A | 8/2003 |
| JP | 2005-077635 A | 3/2005 |

OTHER PUBLICATIONS

Official Communication issued in International Patent Application No. PCT/JP2007/059933, mailed on Jun. 26, 2007.

* cited by examiner

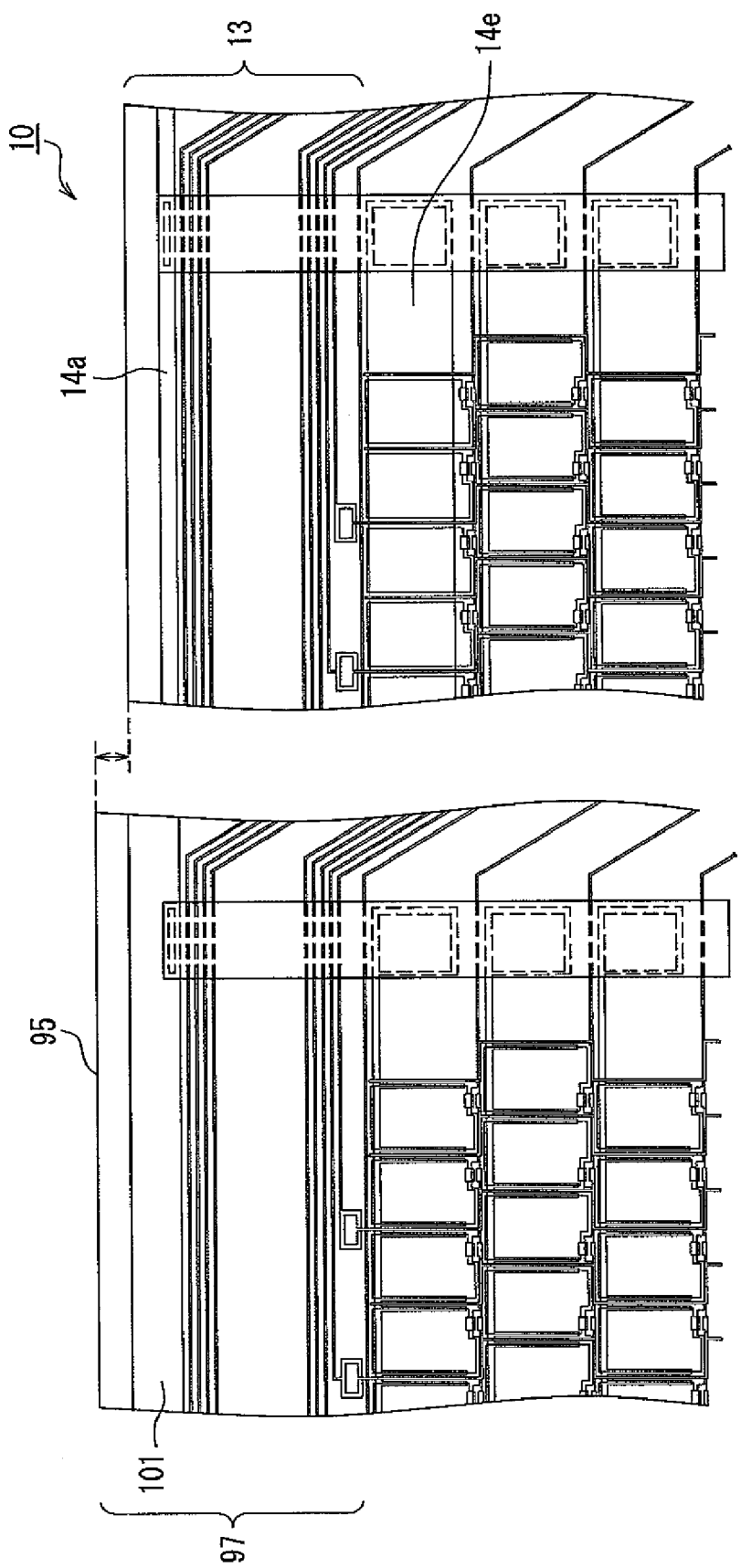

DISPLAY DEVICE INCLUDING DUMMY PIXEL REGION

BACKGROUND OF THE INVENTION

1. Field of the Invention

The present invention relates to an active matrix type display device. More specifically, the present invention relates to a display device having a drive circuit (driver) along one side of an active matrix substrate.

2. Description of the Related Art

An active matrix substrate, which is prepared by forming scanning lines and signal lines in a matrix configuration on a substrate and forming a driving element such as a TFT (Thin Film Transistor) at the intersections of these signal lines, has been used generally for a liquid crystal display device and the like. In such a conventional active matrix substrate as shown in FIG. 17, a scanning line drive circuit 91 is provided at one end of the scanning lines G arranged in parallel or substantially parallel to each other, and a signal line drive circuit 92 is provided at one end of the signal lines S arranged in parallel to each other and perpendicularly to the scanning lines G. Namely, in a conventional active matrix substrate 90 as shown in FIG. 17, the scanning line drive circuit 91 and the signal line drive circuit 92 are provided respectively on the adjacent two sides in a peripheral region 94 of a pixel region 93.

According to the recent development in the semiconductor manufacturing technology, the trend for higher integration of a drive circuit has been advanced. For a display device, it is desired to downsize the cabinet of the display device while maintaining the size of the display region, and thus an important object for resolving this problem is to narrow the frame. Due to the circumstances, an attempt to mount both a scanning line drive circuit and a signal line drive circuit on only one side of a peripheral region of an active matrix substrate has been carried out (see, for example, JP 2003-241217 A).

Specifically, as shown in FIG. 18, JP 2003-241217 A (see FIG. 4 of this document) discloses a constitution where a drive circuit 98 formed by integrating a scanning line drive circuit and a signal line drive circuit is mounted on only one side of an active matrix substrate 95.

This document discloses also in FIG. 3 and the like a constitution where a scanning line drive circuit is arranged on one side of the active matrix substrate 95 and where signal line drive circuits are arranged on both sides of this scanning line drive circuit. In the conventional active matrix substrate as shown in FIG. 18, the plural signal lines S disposed in parallel to each other are led out respectively to the both sides of the pixel region 96 alternately and connected to the drive circuit 98, thereby equalizing the widths of the frame region 97 in the extending direction at the both sides of the signal lines S.

The conventional constitution as shown in FIG. 18 has been employed preferably to display devices especially for smaller electronic equipment such as portable telephones, digital cameras, and PDAs (Personal Digital Assistants).

However, due to the recent trend for higher resolution of display devices, the numbers of signal lines wired on a frame region have increased rapidly. Particularly, in a high-definition panel with numbers of signal lines, it is required to reduce the width of each signal line and the intervals between the signal lines, and degradation in the yield caused by wiring leaks and breaking of wire cannot be avoided. Therefore, in such a high-definition panel, when an improvement in the yield is required, the frame width cannot be decreased due to the restriction in the wiring layout of the active matrix substrate.

A counter substrate that faces the active matrix substrate has a common electrode formed on the whole surface. To this common electrode, a predetermined voltage (common voltage $V_{com}$) is applied via a common wiring 101 from a drive circuit (not shown in FIG. 18) provided for example on an active matrix substrate or a FPC (Flexible Printed Circuit) connected to the active matrix substrate. In such a case, a contact 102 (referred to as "common transfer") for electrically connecting the common wiring 101 and the common electrode on the counter substrate is provided on the active matrix substrate 95. The common transfer 102 is formed of an electroconductive material such as carbon paste and gold, and it has a cross sectional area of about 500 $\mu m^2$ to 1 $mm^2$. When a drive circuit 98 is arranged on one side of the peripheral region of the pixel region 96 as shown in FIG. 18, the common transfer cannot be arranged around the drive circuit 98 since lead wirings from the drive circuit 98 are crowded there. Therefore, as shown in FIG. 18, the common transfer 102 is arranged on a region of the frame region 97 of the active matrix substrate 95 where the lead wirings are not provided. It is also required to lead the common wiring 101 along the periphery of the pixel region 96 from the drive circuit side to the common transfer 102.

The common wiring 101 is required to have a low resistance in order to avoid display failures such as non-uniformity, crosstalk or the like caused by signal delay of the common electrode. For this purpose, the common wiring 101 is required to have a sufficient width. As a result, in the conventional active matrix substrate as shown in FIG. 18, it is required to maintain not only a region for leading the signal lines S but a region for leading the common wiring 101 of a sufficient width around the pixel region 96, and thus the area of the frame region cannot be reduced.

SUMMARY OF THE INVENTION

With the foregoing in mind, preferred embodiments of the present invention provide a display device having a frame region area that is decreased without degrading the yield and a drive circuit arranged on one side of an active matrix substrate and feeding a common voltage $V_{com}$ to a counter substrate side via a common transfer of the active matrix substrate.

A first display device according to a preferred embodiment of the present invention includes an active matrix substrate and a counter substrate, the active matrix substrate including scanning lines and signal lines arranged in a matrix configuration, and a pixel region including an actual pixel region including an effective pixel for performing a display in accordance with a data signal supplied by the signal lines, and a dummy pixel region positioned at the panel end side as compared to the actual pixel region, the display device including a bus line drive circuit that is arranged on one side of the active matrix substrate and outside the pixel region and that supplies a scanning signal and a data signal to the scanning lines and the signal lines, respectively, and a common drive circuit that generates a common signal to be supplied to a common electrode of the counter substrate, the active matrix substrate including a common transfer that is provided on a side facing the side of the active matrix substrate on which the bus line drive circuit is arranged and that supplies the common signal to the common electrode of the counter substrate, and a common wiring arranged to supply the common signal to the common transfer, wherein at least a portion of the common wiring is arranged in the dummy pixel region of the pixel region.

According to the above-mentioned constitution where at least a portion of the common wiring is arranged in the dummy pixel region of the pixel region, the width of the common wiring arranged outside the pixel region can be decreased in comparison with the conventional constitution where the entire common wiring is arranged outside the pixel region, and/or the common wiring outside the pixel region can be eliminated. Thereby, the width of the frame region can be decreased in comparison with the conventional constitution, and thus a display device with a reduced frame region area can be provided without degrading the yield.

It is preferable in the first display device that the common wiring arranged in the dummy pixel region is connected electrically to an auxiliary capacity wiring in the pixel region.

It is preferable in the first display device that the common wiring arranged in the dummy pixel region is independent electrically from an auxiliary capacity wiring in the pixel region.

It is preferable in the first display device that a dummy auxiliary capacity wiring is arranged further in the dummy pixel region, preferably parallel or substantially parallel to the auxiliary capacity wiring in the pixel region.

It is preferable in the first display device that the width of the auxiliary capacity wiring is narrower at a portion crossing the signal lines as compared to a general width of the common wiring.

It is preferable in the first display device that the end portions of the signal lines opposite to the signal input side are arranged not to cross the dummy auxiliary capacity wiring.

It is preferable in the first display device that the pixel electrode in the actual pixel region defines an auxiliary capacitor with a scanning line adjacent to a scanning line that drives the pixel electrode.

It is preferable in the first display device that the width of the common wiring in the dummy pixel region is narrower at a portion crossing the signal lines as compared to the general width of the common wiring.

It is preferable in the first display device that the end portions of the signal lines opposite to the signal input side are arranged not to cross the common wiring of the dummy pixel region.

It is preferable in the first display device that a shielding member arranged to visually shield the dummy pixel region is also provided.

It is preferable in the first display device that a liquid crystal is provided between the active matrix substrate and the counter substrate.

A second display device according to another preferred embodiment of the present invention includes a display medium between an active matrix substrate and a counter substrate, the active matrix substrate including scanning lines and signal lines arranged in a matrix configuration, and a pixel region including an actual pixel region including an effective pixel for performing a display in accordance with a data signal supplied by the signal lines, and an impurity trapping region that is positioned at the panel end side as compared to the actual pixel region and that is formed with a trap wiring for electrically trapping impurities in the display medium, the display device including a bus line drive circuit that is arranged on one side of the active matrix substrate and outside the pixel region and that supplies a scanning signal and a data signal to the scanning lines and the signal lines, respectively, and a common drive circuit that generates a common signal to be supplied to a common electrode of the counter substrate, the active matrix substrate including a common transfer that is provided on a side facing the side of the active matrix substrate on which the bus line drive circuit is arranged and that supplies the common signal to the common electrode of the counter substrate, and a common wiring arranged to supply the common signal to the common transfer, where at least a portion of the common wiring is arranged in the impurity trapping region of the pixel region.

According to the above-mentioned constitution where at least a portion of the common wiring is arranged in the impurity trapping region of the pixel region, the width of the common wiring arranged outside the pixel region can be decreased in comparison with the conventional constitution where the entire common wiring is arranged outside the pixel region, and/or the common wiring outside the pixel region can be eliminated. Thereby, the width of the frame region can be decreased in comparison with the conventional constitution, and thus a display device with a reduced frame region area can be provided without degrading the yield.

It is preferable in the second display device that the width of the common wiring in the impurity trapping region is narrower at a portion crossing the signal lines as compared to the general width of the common wiring.

It is preferable in the second display device that the end portions of the signal lines opposite to the signal input side are arranged not to cross the common wiring of the impurity trapping region.

It is preferable in the first or second display device that the display medium is a liquid crystal.

As mentioned above, preferred embodiments of the present invention can provide a display device having a drive circuit arranged on one side of an active matrix substrate and arranged to feed a common voltage $V_{com}$ to a counter substrate side via a common transfer of the active matrix substrate, where the frame region area can be reduced without degrading the yield.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 4A-4C show the cross-sectional constitution of a liquid crystal display device according to a preferred embodiment of the present invention, wherein FIG. 4A is a plan view showing the positions of cross sections; FIG. 4B is a cross-sectional view showing the constitution of the liquid crystal display device taken along the line A-A' in FIG. 4A; and FIG. 4C is a cross-sectional view showing the constitution of the liquid crystal display device taken along the line B-B' in FIG. 4A.

FIGS. 5A and 5B are views for explaining the effect of the active matrix substrate according to a preferred embodiment of the present invention.

FIGS. 15A-15C show the cross-sectional constitution of a liquid crystal display device according to a preferred embodiment of the present invention, wherein FIG. 15A is a plan view showing the positions of cross sections; FIG. 15B is a cross-sectional view showing the constitution of the liquid crystal display device taken along the line A-A' in FIG. 16A; and FIG. 15C is a cross-sectional view showing the constitution of the liquid crystal display device taken along the line B-B' in FIG. 16A.

DETAILED DESCRIPTION OF THE PREFERRED EMBODIMENTS

Preferred embodiments of the present invention will be described below with reference to the attached drawings. It should be noted for each of the drawings that only the main components among the components at every portion of the display device in preferred embodiments of the present invention are shown while the remaining components are simplified or not shown, for the purpose of convenience in explanation. Therefore, the display device of the present invention may include arbitrary components not shown in the respective drawings for reference in the specification. It should be noted also that the dimensions of the components in the respective drawings do not necessarily indicate the actual dimensions of the components, dimensional ratios among the respective components and the like. Furthermore, the display devices of the present invention may be employed as a liquid crystal display device in each of the preferred embodiments below, but the present invention is not limited to the liquid crystal display device.

First Preferred Embodiment

Figure 1:
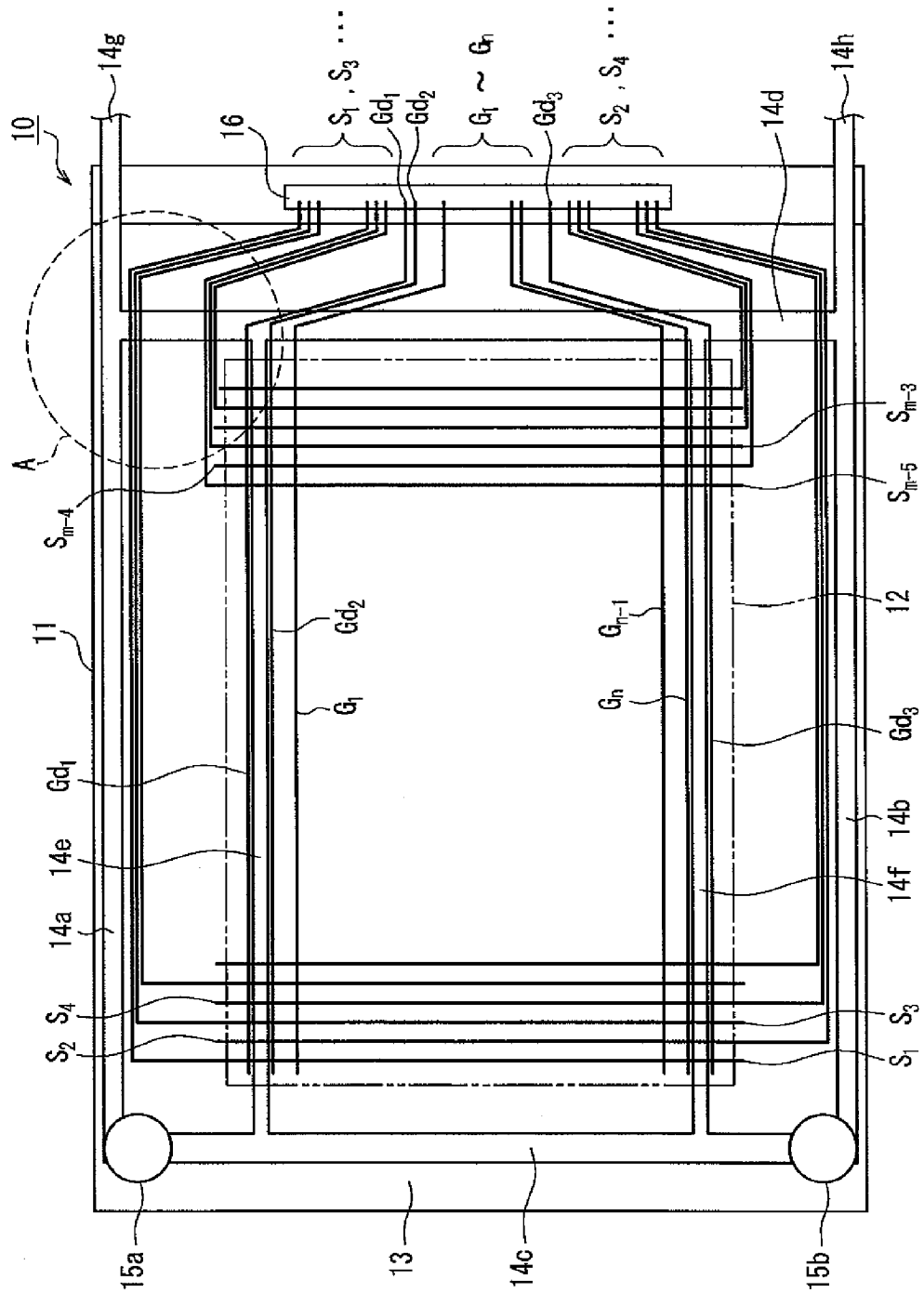
FIG. 1 is a plan view showing a schematic constitution of an active matrix substrate according to a preferred embodiment of the present invention.
Figure 2:
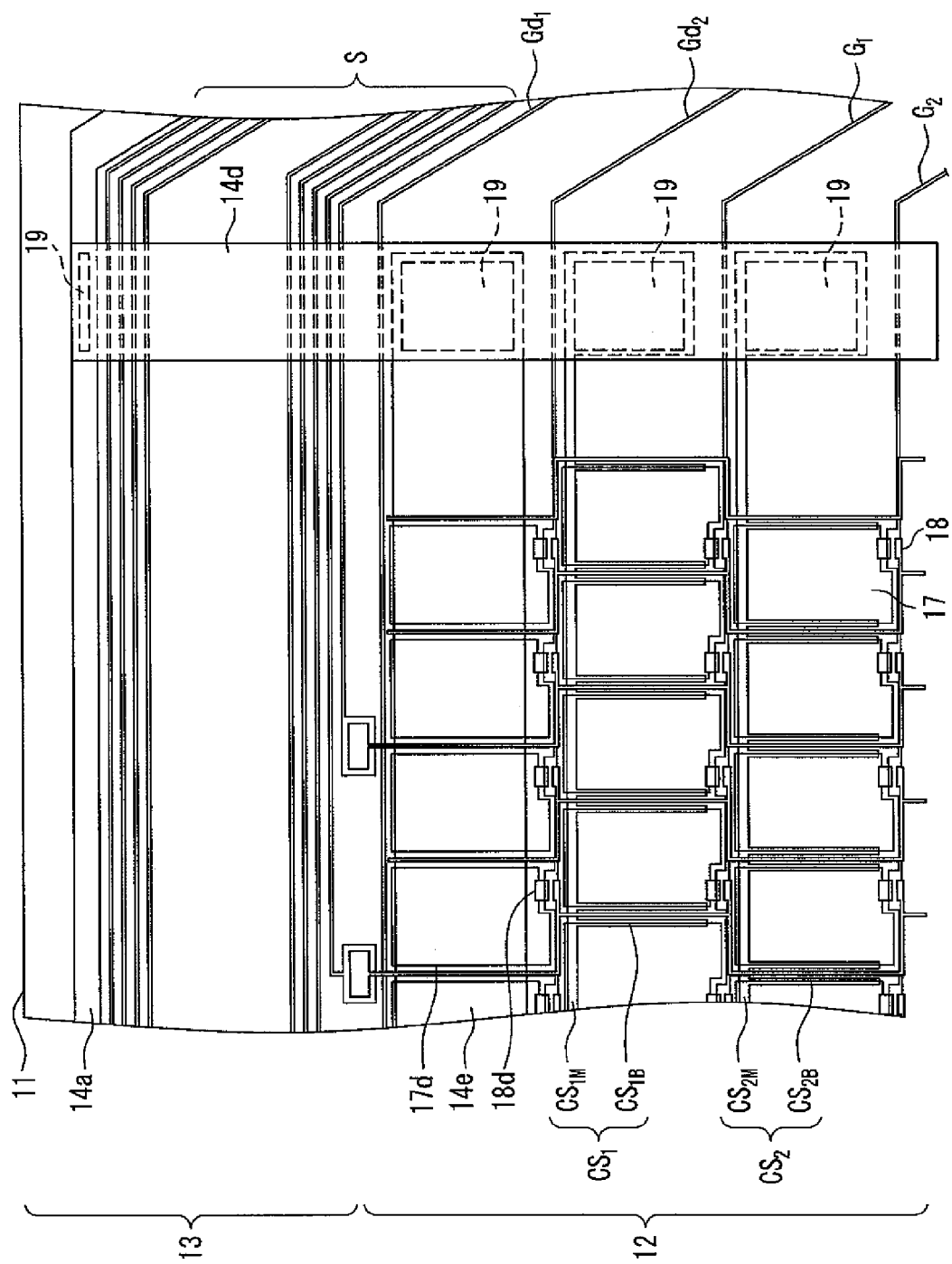
FIG. 2 is an enlarged plan view showing inside and the vicinity of the circle-A in FIG. 1.

FIG. 1 is a plan view showing a schematic constitution of an active matrix substrate 10 according to a preferred embodiment of the present invention. FIG. 2 is an enlarged plan view showing inside and the vicinity of the circle-A in FIG. 1. The active matrix substrate 10 according to the present preferred embodiment is used for a display device such as a liquid crystal display device. The active matrix substrate 10 is formed of a translucent substrate 11 of glass or the like on which scanning lines G of n in number and signal lines S of m in number are arranged to cross each other, and the active matrix substrate 10 has a pixel region 12 having a TFT and a pixel electrode (either of which is not shown) at each intersection of the scanning lines G and the signal lines S. It should be noted that in FIG. 1, FIG. 2 and any other drawings to be referred to in the Specification, not all of the scanning lines G and the signal lines S are shown. The driving element is not limited to the TFT. In the active matrix substrate 10, a region surrounding the rectangular pixel region in a frame shape and having an overlap with a counter substrate is denoted as a frame region 13. A bus line drive circuit 16, which is formed by integrating in one chip a scanning line drive circuit that drives the scanning lines G and a signal line drive circuit that drives the signal lines S, is mounted on one side of the active matrix substrate 10 by a COG (Chip On Glass) process for example. Alternatively, the bus line drive circuit is formed directly on the active matrix substrate 10.

In the frame region 13, common transfers 15a and 15b are provided in the vicinity of the both end portions of the side facing the side on which the bus line drive circuit 16 is arranged. The common transfers 15a, 15b are formed of an electroconductive material such as carbon paste and gold, and generally has a cross sectional area of, for example, about 500 $\mu m^2$ to 1 $mm^2$. The numbers of the common transfers are not limited to two.

Among the signal lines S of m in number, a signal line spaced most from the bus line drive circuit 16 is denoted as $S_1$, and a signal line located closest to the bus line drive circuit 16 is denoted as $S_m$. Approximately half the signal lines S are led out from the pixel region 12 and subsequently connected to the bus line drive circuit 16 through one side in the frame region 13; the remaining signal lines S are led out in the direction opposite to the above-mentioned former half of the signal lines S and subsequently connected to the bus line drive circuit 16 through the frame region 13. Namely, in the example shown in FIG. 1, $S_2, S_4, S_6, \ldots$ among the signal lines S of m in number are connected to the bus line drive circuit 16 through the upper side of the frame region 13 in FIG. 1, and $S_1, S_3, S_5, \ldots$ are connected to the bus line drive circuit 16 through the lower side of the frame region 13 in FIG. 1. In this manner, by sharing the signal lines S into two substantially equal groups and wiring on two sides facing each other in the frame region 13, the widths of the two sides of the frame region 13 can be equalized. In the example of FIG. 2, the signal lines $S_1, S_2, S_3, S_4, \ldots$ of m in number are led out alternately into two sides facing each other in the frame region 13. This is not the sole example, but alternatively, the signal lines $S_1$-$S_{m/2}$ can be led to one side of the frame region 13, and the signal lines $S_{(m/2)+1}$-$S_m$ can be led in the opposite direction. It is not necessarily required in various preferred embodiments of the present invention that the signal lines S are shared into two substantially equal groups facing each other and wired in the frame region 13.

The scanning lines G include not only the scanning lines $G_1$-$G_n$ of n in number to which a scanning signal for turning the TFT gate ON is applied with a predetermined timing, but also dummy scanning lines $G_{d1}$, $G_{d2}$ and $G_{d3}$. In FIG. 1, two dummy scanning lines $G_{d1}$ and $G_{d2}$ are preferably provided outside the scanning line $G_1$ for the purpose of indicating a constitution that one dummy scanning line $G_{d3}$ is provided outside the scanning line $G_n$, but the numbers of the dummy scanning lines are not limited to this example. To the dummy scanning lines $G_{d1}$, $G_{d2}$ and $G_{d3}$, signals similar to the scanning signals of the display region or signals that do not function as scanning signals are applied from the bus line drive circuit 16. The signals that do not function as scanning signals have potential lower than the High potential to turn the TFT gate ON. Alternatively, the dummy scanning lines $G_{d1}$, $G_{d2}$ and $G_{d3}$ can be applied constantly with potential equal to the Low potential of the scanning signal.

FIG. 2 is an enlarged plan view showing inside and the vicinity of the circle-A in FIG. 1. As shown in FIG. 2, a pixel electrode 17d and a TFT 18d are provided in a region between the dummy scanning line $G_{d1}$ and the dummy scanning line $G_{d2}$ just like the pixel electrode 17 and the TFT 18 in the actual pixel region. The gate electrode of the TFT 18d is connected to the dummy scanning line $G_{d2}$. The drain electrode of the TFT 18d is connected to the pixel electrode 17d (see also FIG. 3 below). As mentioned above, the dummy scanning lines $G_{d1}$, $G_{d2}$ and $G_{d3}$ are applied with signals that do not function as scanning signals, and thus the pixel electrode 17d connected to the dummy scanning line $G_{d1}$ through the TFT 18d constitutes a picture element (dummy picture element) that does not contribute to a display. The region formed with a dummy picture element not contributing to a display is called a "dummy picture element region". A region where a picture element contributing to a display (effective pixel) is formed (i.e., a region between the dummy scanning line $G_{d2}$ and the scanning line $G_n$) is called an "actual picture element region".

In the present preferred embodiment, a liquid crystal display device that performs a color display by using a color filter of three colors of RGB is applied for example, and "picture element" denotes one pixel corresponding to a color filter of one color. Here, "dummy pixel region" and "dummy picture element region" are synonymous, and "actual pixel region" and "actual picture element region" are synonymous. As mentioned above, since the dummy picture element region does not contribute to a display, preferably it is shielded with either a black matrix provided on the counter substrate or a shielding plate bonded on the surface of either an active matrix substrate or a counter substrate.

Figure 3:
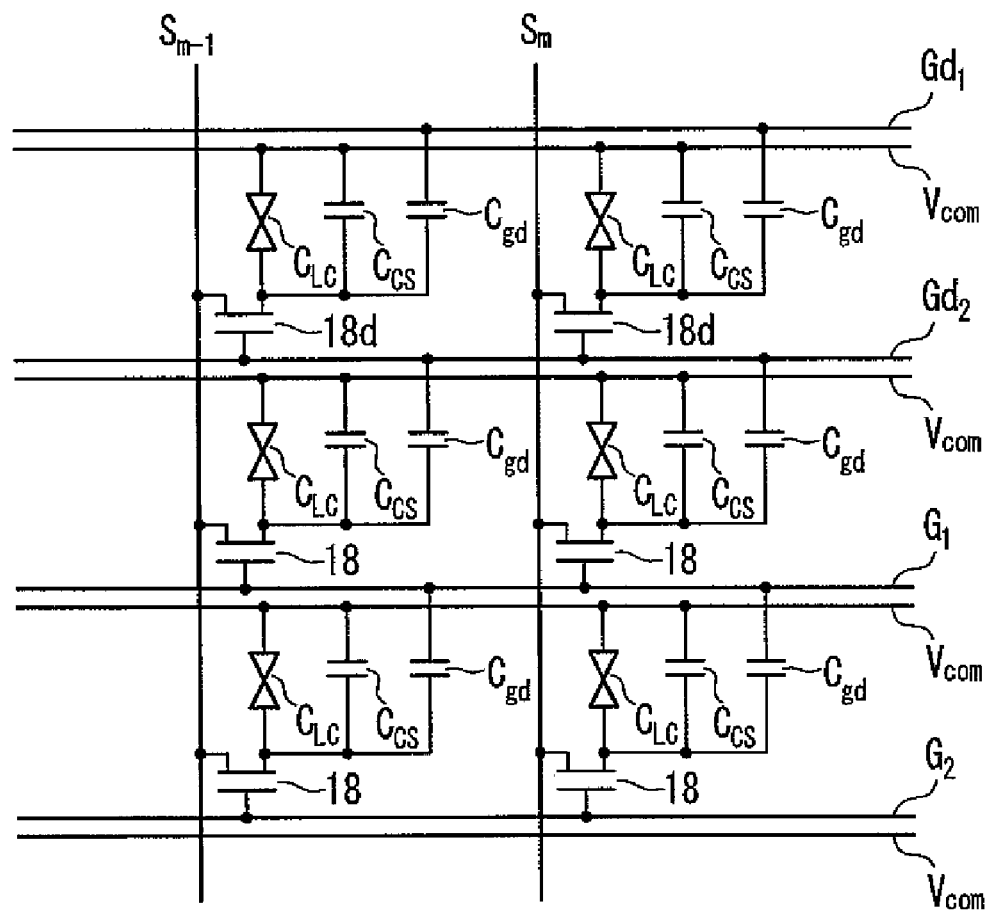
FIG. 3 is an equivalent circuit diagram of a dummy picture element region and an actual picture element region in the vicinity of the dummy picture element region.

FIG. 3 is an equivalent circuit diagram showing a dummy picture element region and an actual picture element region in the vicinity thereof. According to this constitution where the dummy scanning lines $G_{d1}$ and $G_{d2}$ are provided outside the actual picture element region, the sizes of parasitic capacitors $C_{gd}$ between the pixel electrodes and gate bus lines are equalized in the picture elements driven by the top scanning line $G_1$ of the actual picture element region and the picture elements driven by the second and the following scanning lines $G_2$, $G_3$ . . . , thereby preventing a line spectrum at the pixel region end part. Moreover, as a result of providing the dummy scanning line $G_{d3}$ outside the scanning line $G_n$, an effect is obtained, i.e., impurities in the display medium moved by the scanning signal are held in a non-display region.

Common wirings 14a, 14b, 14c and 14d are preferably formed on the four sides of the frame region 13 so as to surround the pixel region 12. For the material of the common wirings 14a, 14b, 14c and 14d, for example, aluminum, molybdenum, tantalum or an alloy thereof is preferably used. The common wirings 14a and 14b are formed on two sides facing each other in the frame region 13 in parallel to the scanning lines G. The common wirings 14c and 14d are formed on two sides facing each other in the frame region 13 in parallel or substantially parallel to the signal lines S. For an electric connection, the above-mentioned common transfer 15a is provided at the joint between the common wiring 14a and the common wiring 14c. Further, for an electric connection, the common transfer 15b is provided at the joint between the common wiring 14b and the common wiring 14c. On the active matrix substrate 10, the common wiring 14d is formed in a layer different from the layer in which the common wirings 14a, 14b and 14c are formed. Therefore for example, as shown in FIG. 2, the common wiring 14a and the common wiring 14d are connected electrically to each other via a contact hole 19 formed in the insulating film between the wirings.

Further, as shown in FIG. 3, auxiliary capacitors $C_{CS}$ are formed in parallel to the liquid crystal capacitors $C_{LC}$ on the active matrix substrate 10 of the present preferred embodiment. Therefore, the active matrix substrate 10 has auxiliary capacity wirings $CS_1$, $CS_2$, . . . in each of the picture elements of the actual picture element region in order to form a capacitor (auxiliary capacitor $C_{CS}$) with the pixel electrode 18. In the example as shown in FIG. 2, the auxiliary capacity wirings $CS_1$, $CS_2$, . . . are constituted of a trunk $CS_{1M}$ parallel to the common wirings 14a, 14b and a branch line $CS_{1B}$ that crosses this trunk $CS_{1M}$. It should be noted that the shape of the auxiliary capacity wirings $CS_1$, $CS_2$, . . . is not limited to the example shown in FIG. 2.

One end of the trunk $CS_{1M}$ of the auxiliary capacity wirings $CS_1$, $CS_2$, . . . is connected electrically to the common wiring 14d via the contact hole 19 as shown in FIG. 2. Though not shown in FIG. 2, the other end of the trunk $CS_{1M}$ of the auxiliary capacity wirings $CS_1$, $CS_2$, . . . is connected similarly to the common wiring 14c via a contact hole. Due to this constitution, the auxiliary capacity wirings $CS_1$, $CS_2$, . . . are held at the same potential as the common wirings 14c, 14d.

Further, in the active matrix substrate 10 according to the present preferred embodiment, as shown in FIG. 1, common wirings 14e and 14f are formed within the pixel region 12, in addition to the common wirings 14a-14d formed in the frame region 13. As shown in FIG. 2, the common wiring 14e parallel to the common wiring 14a is formed in the dummy picture element region between the dummy scanning line $G_{d1}$ and the dummy scanning line $G_{d2}$. The common wiring 14f parallel to the common wiring 14a is formed in the dummy picture element region between the dummy scanning line $G_{d3}$ and the scanning line $G_n$. The both ends of the common wiring 14e are connected electrically to the common wiring 14c and the common wiring 14d respectively. Similarly, the both ends of the common wiring 14f are connected electrically to the common wiring 14c and the common wiring 14d respectively. The common wirings 14e and 14f are formed in the same layer as the common wirings 14a, 14b, 14c but different from the common wiring 14d. Therefore, as shown in FIG. 2, the common wiring 14e and the common wiring 14d are connected to each other electrically via the contact hole 19 formed in the insulating films of these wirings. Although not shown in FIG. 2, the common wiring 14f and the common wiring 14d are connected electrically to each other similarly.

Figure 4A:
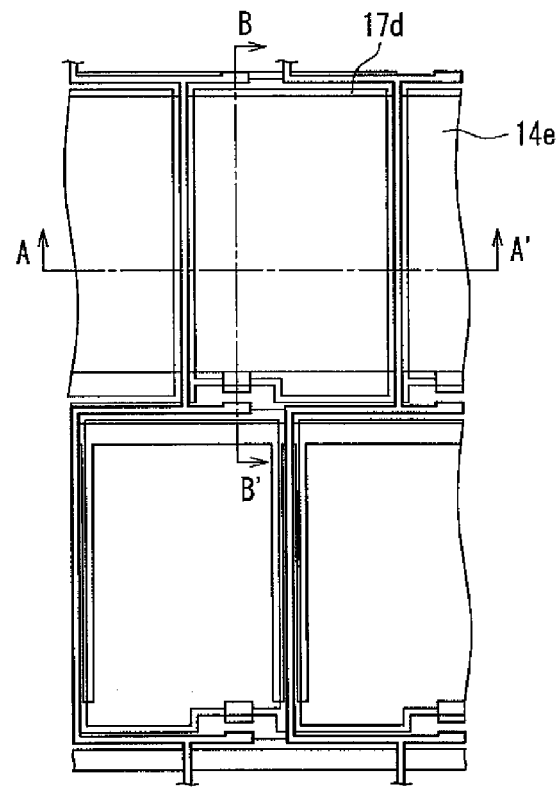
Figure 4B:
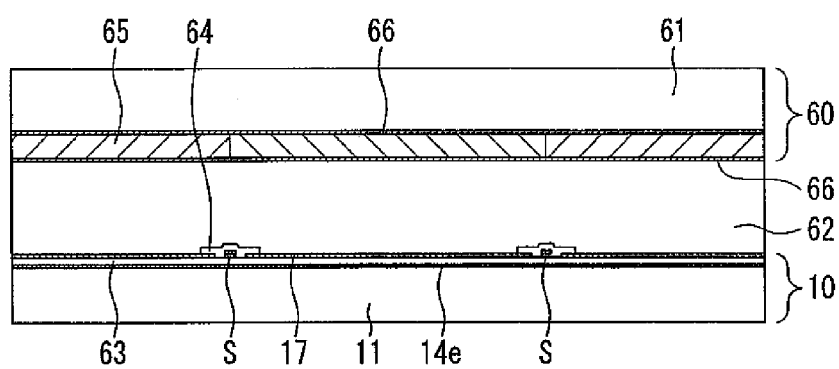
Figure 4C:
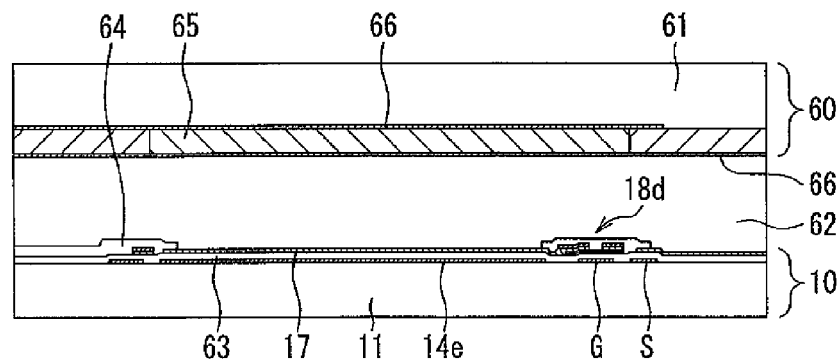

FIGS. 4A-4C show a cross sectional structure of a liquid crystal display device according to the present preferred embodiment. FIG. 4A is a plan view showing the positions of cross-sections; FIG. 4B is a cross-sectional view showing a constitution of the liquid crystal display device taken along a line A-A' in FIG. 4A; and FIG. 4C is a cross-sectional view showing a constitution of the liquid crystal display device taken along a line B-B' in FIG. 4A. The oriented films are not shown in FIGS. 4B and 4C. Though FIGS. 4A-4C show only the cross-sectional structure of a common wiring 14e, the common wiring 14f has the substantially same cross-sectional structure.

As shown in FIG. 4B, the liquid crystal display device of the present embodiment has a liquid crystal 62 interposed between the active matrix substrate 10 and the counter substrate 60. As shown in FIG. 4B, the common wiring 14e, a first insulating film 63, signal lines S, a second insulating film 64, and an oriented film (not shown) are formed in this order on the surface of the translucent substrate 11 of the active matrix substrate 10. Similarly, a black matrix 66, a color filter 65, a common electrode 66 and an oriented film (not shown) are formed on the surface of a translucent substrate 61 of the counter substrate 60.

Though not necessarily, it is preferable that the widths of the common wirings 14e and 14f are increased as much as possible within a range of the dummy picture element region. When the widths of the common wirings 14e and 14f in the dummy picture element region are increased, the widths of the common wirings 14a and 14b in the frame region 13 can be decreased, and thereby serving to decrease the width of the frame region 13. The common voltage $V_{com}$ to be fed respectively to input ports 14g and 14h at the common wirings 14a and 14b is transmitted respectively to the common transfer 15a and 15b via the common wirings 14a and 14b, and at the same time, transmitted respectively to the common transfers 15a and 15b via a portion of the common wiring 14d, the common wiring 14e and 14f and a portion of the common wiring 14c. Namely, the common wirings 14e and 14f are lines for connecting in parallel the input ports 14g, 14h of the common wirings 14a, 14b as the ports for feeding the common voltage $V_{com}$ and the common transfers 15a, 15b, together with the portions of the common wirings 14d, 14c. Therefore, as the widths of the common wirings 14e and 14f are increased to decrease the wiring resistance, the widths of the common wirings 14a and 14b of the frame region 13 can be decreased. When the dummy picture element region is sufficiently wide and the widths of the common wirings 14e, 14f can be increased sufficiently, the common wiring in the frame region 13 can be eliminated completely.

Figure 18:
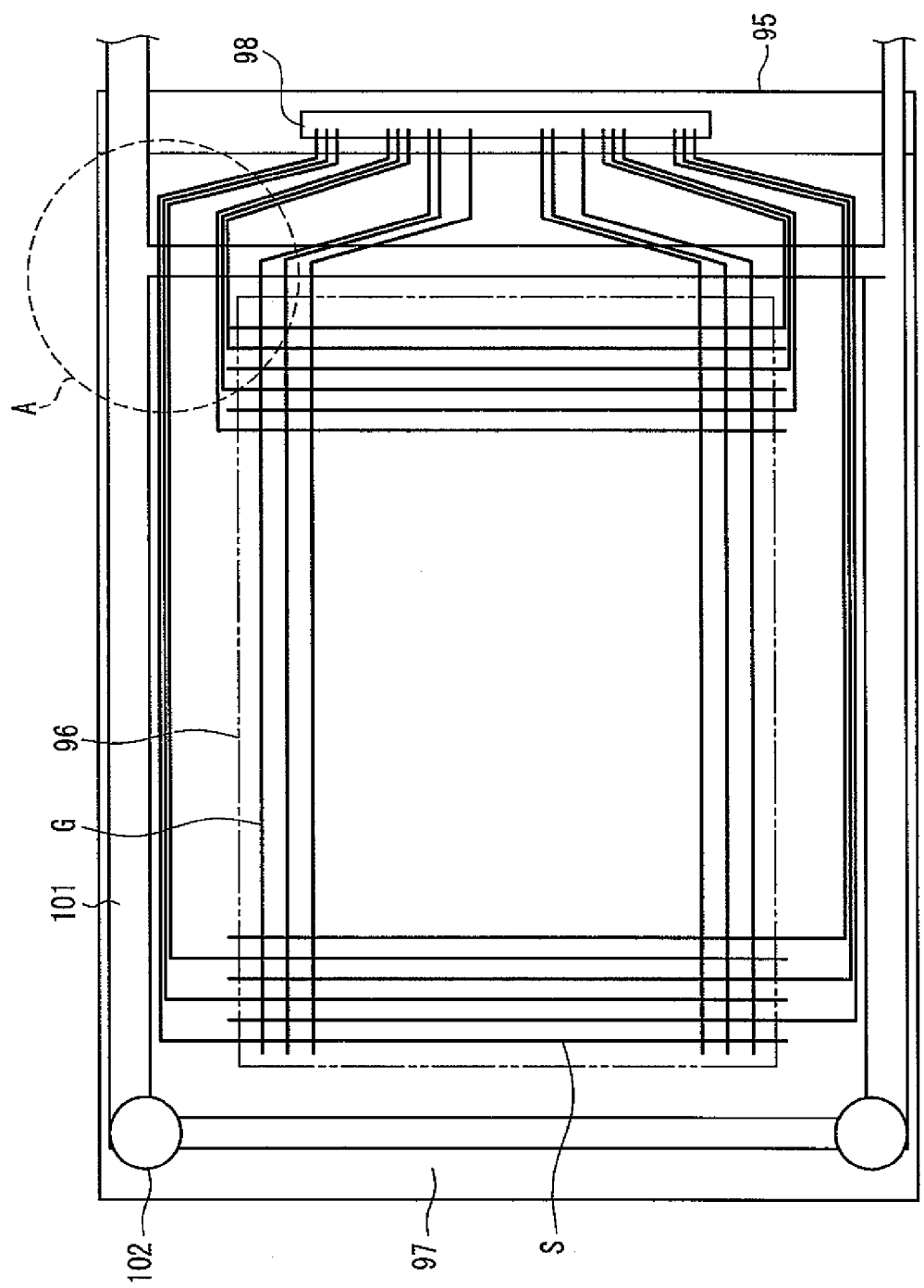
FIG. 18 is a plan view showing a constitution of an active matrix substrate of a conventional display device.

FIG. 5 consists of plan views for explaining the effect of the active matrix substrate 10 according to the present preferred embodiment. FIG. 6A shows a conventional constitution where common wirings are arranged only in the frame region as shown in FIG. 18, and FIG. 5B shows a constitution of the present preferred embodiment as shown in FIGS. 1 and 2, where the width of the frame regions are shown in a comparative contraction. As clearly shown from the comparison between the FIGS. 5A and 5B, in the active matrix substrate 10 according to the present preferred embodiment where the common wirings 14e and 14f are provided also to the dummy picture element region in the pixel region 12, the width of the frame region 13 can be decreased in comparison with the width of the frame region 97 in the conventional constitution.

Second Preferred Embodiment

Figure 6:
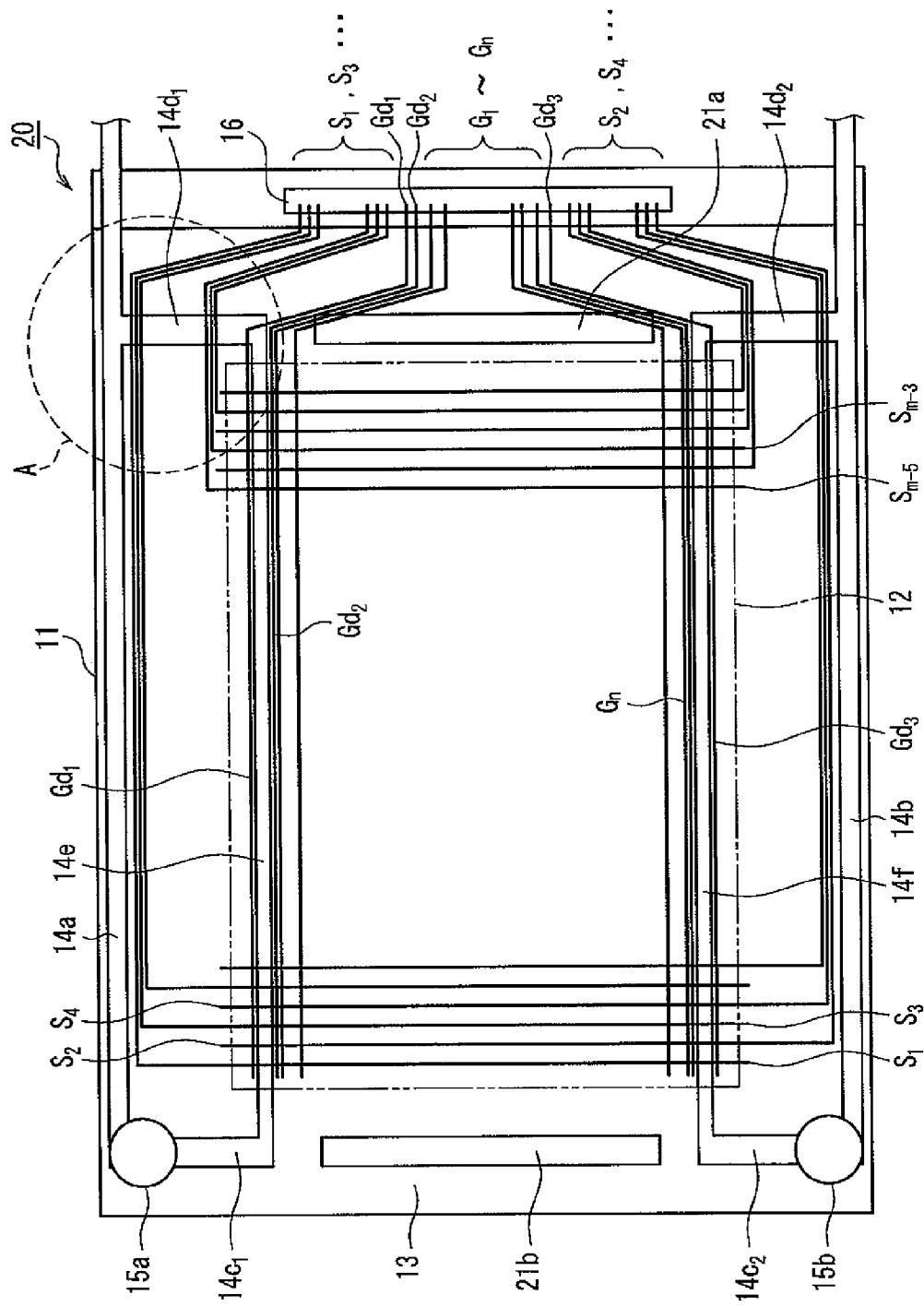
FIG. 6 is a plan view showing a schematic constitution of an active matrix substrate of a liquid crystal display device according to another preferred embodiment of the present invention.
Figure 7:
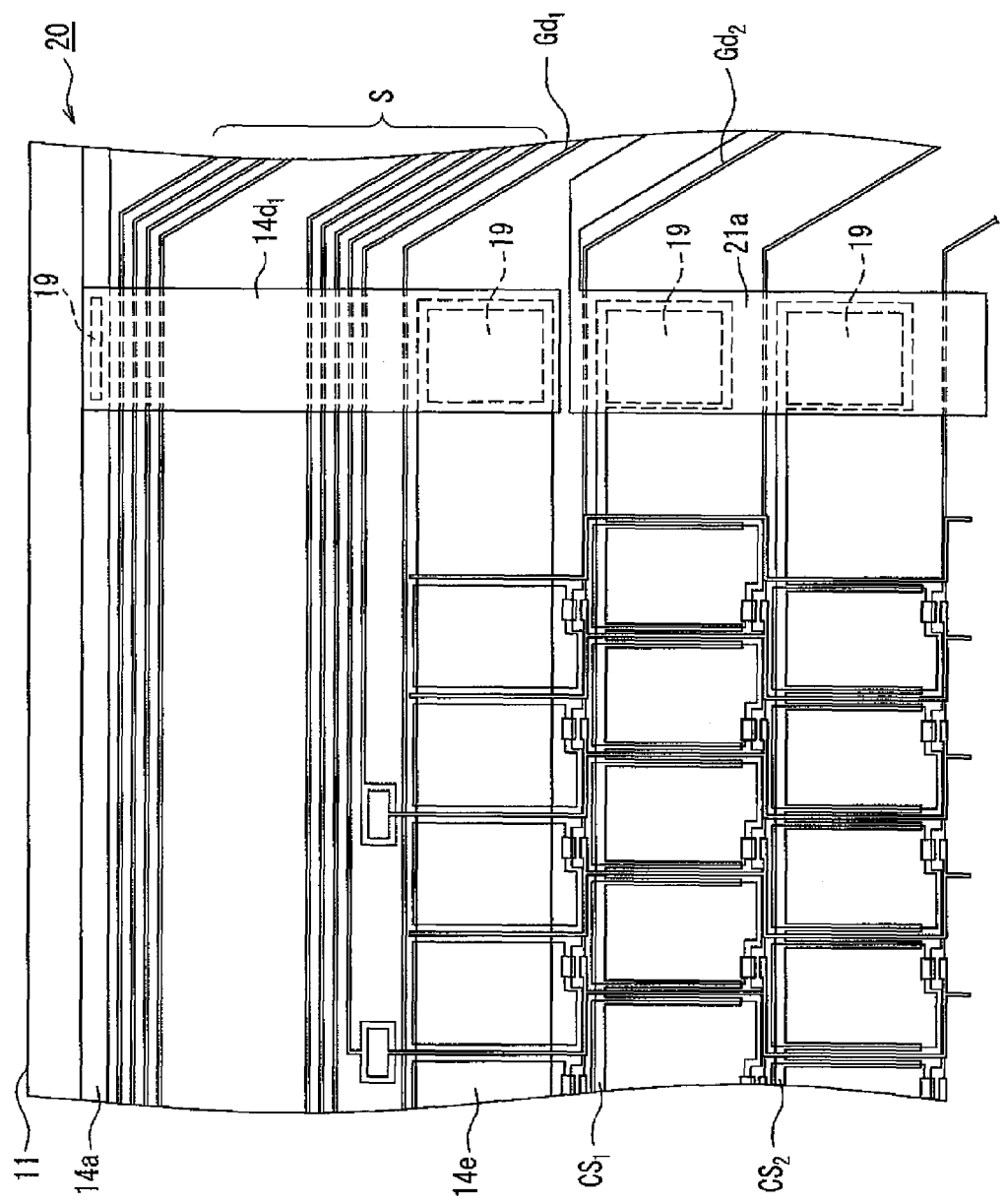
FIG. 7 is an enlarged plan view showing inside and the vicinity of the circle-A in FIG. 6.

FIG. 6 is a plan view showing a schematic constitution of an active matrix substrate 20 of a liquid crystal display device according to a preferred embodiment of the present invention. FIG. 7 is an enlarged plan view showing inside and the vicinity of the circle-A in FIG. 6. Components similar to those having been explained in the first preferred embodiment are provided with the same reference signs as in the first preferred embodiment in order to avoid duplicated explanations.

As shown in FIGS. 6 and 7, the active matrix substrate 20 according to the present preferred embodiment is similar to the counterpart in the first preferred embodiment in that the common wirings 14a and 14b are provided in the frame region 13 in parallel or substantially parallel to the signal lines S and that the common wirings 14e and 14f are provided in the dummy picture element region of the pixel region 12, which serves to decrease the width of the frame region 13.

However, the second preferred embodiment is different from the first embodiment in that common wirings $14c_1$ and $14d_1$ connect the common wiring 14a to the common wiring 14e so as to form a closed loop electrically, and that common wirings $14c_2$ and $14d_2$ connect the common wiring 14b to the common wiring 14f so as to form a closed loop electrically.

Further, the second preferred embodiment is different from the first preferred embodiment in that, as shown in FIG. 7, a voltage is fed to one end of the auxiliary capacity wirings $CS_1$, $CS_2$, . . . via an auxiliary capacity wiring 21a independent from (not connected electrically to) the common wirings. Therefore, a voltage different from the common voltage $V_{com}$ can be fed to the auxiliary capacity wiring CS. As shown in FIG. 6, an auxiliary capacity wiring 21b like the auxiliary capacity wiring 21a is formed at the other end of the auxiliary capacity wirings $CS_1$, $CS_2$, . . . in order to connect electrically the auxiliary capacity wirings $CS_1$, $CS_2$, . . . to each other. A connection between the auxiliary capacity wirings 21a, 21b and the auxiliary capacity wirings $CS_1$, $CS_2$, . . . is not shown in FIG. 6.

The second preferred embodiment is advantageous in comparison with the first preferred embodiment in the following points. Namely, when the display device according to the second preferred embodiment is employed for a normally white liquid crystal display device, critical defects (luminescent spot) can be avoided by feeding a voltage different from the common voltage $V_{com}$, even when there is a failure that the auxiliary capacity wiring and the pixel element run short within the pixel.

Third Preferred Embodiment

Figure 8:
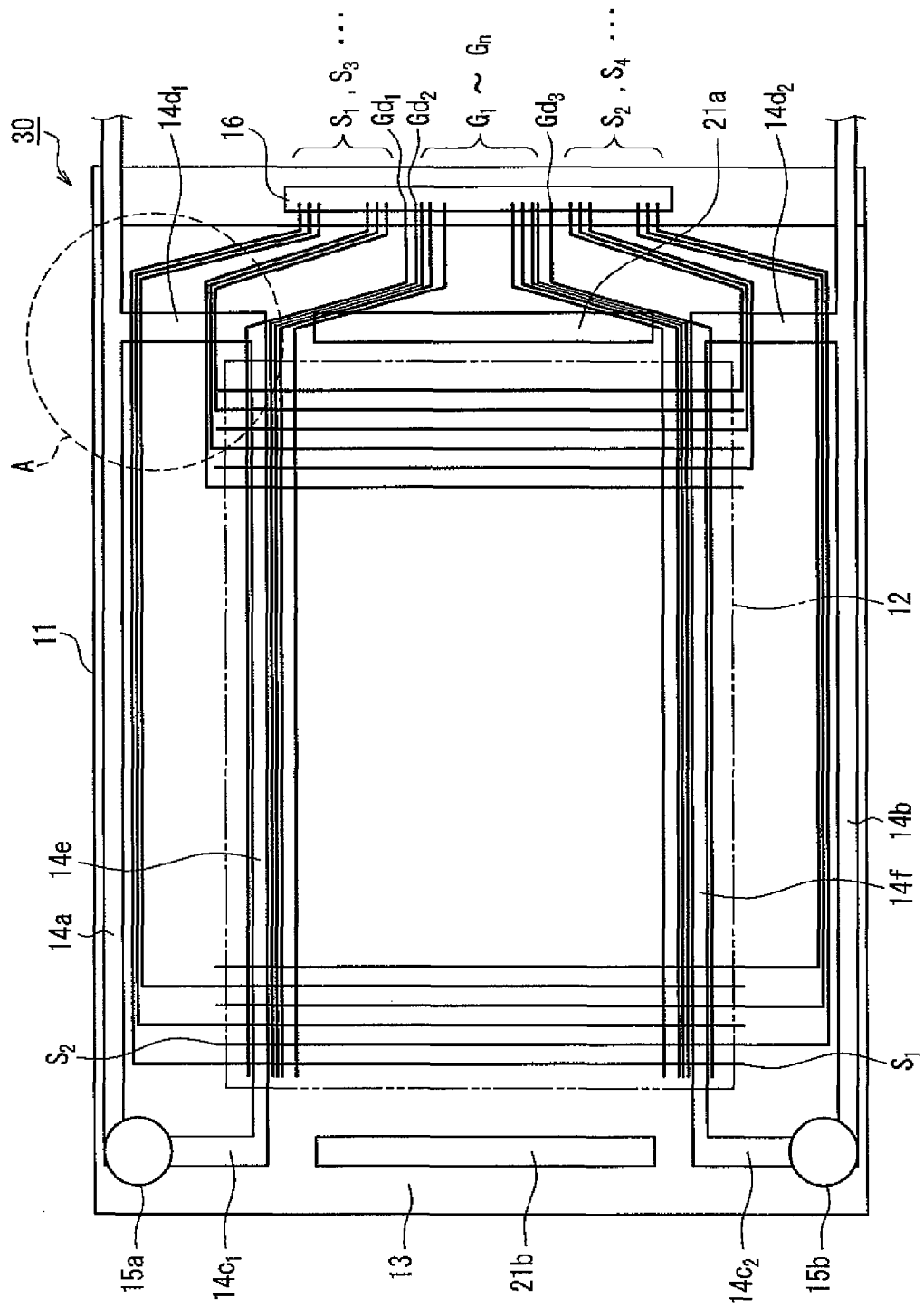
FIG. 8 is a plan view showing a schematic constitution of an active matrix substrate of a liquid crystal display device according to a further preferred embodiment of the present invention.
Figure 9:
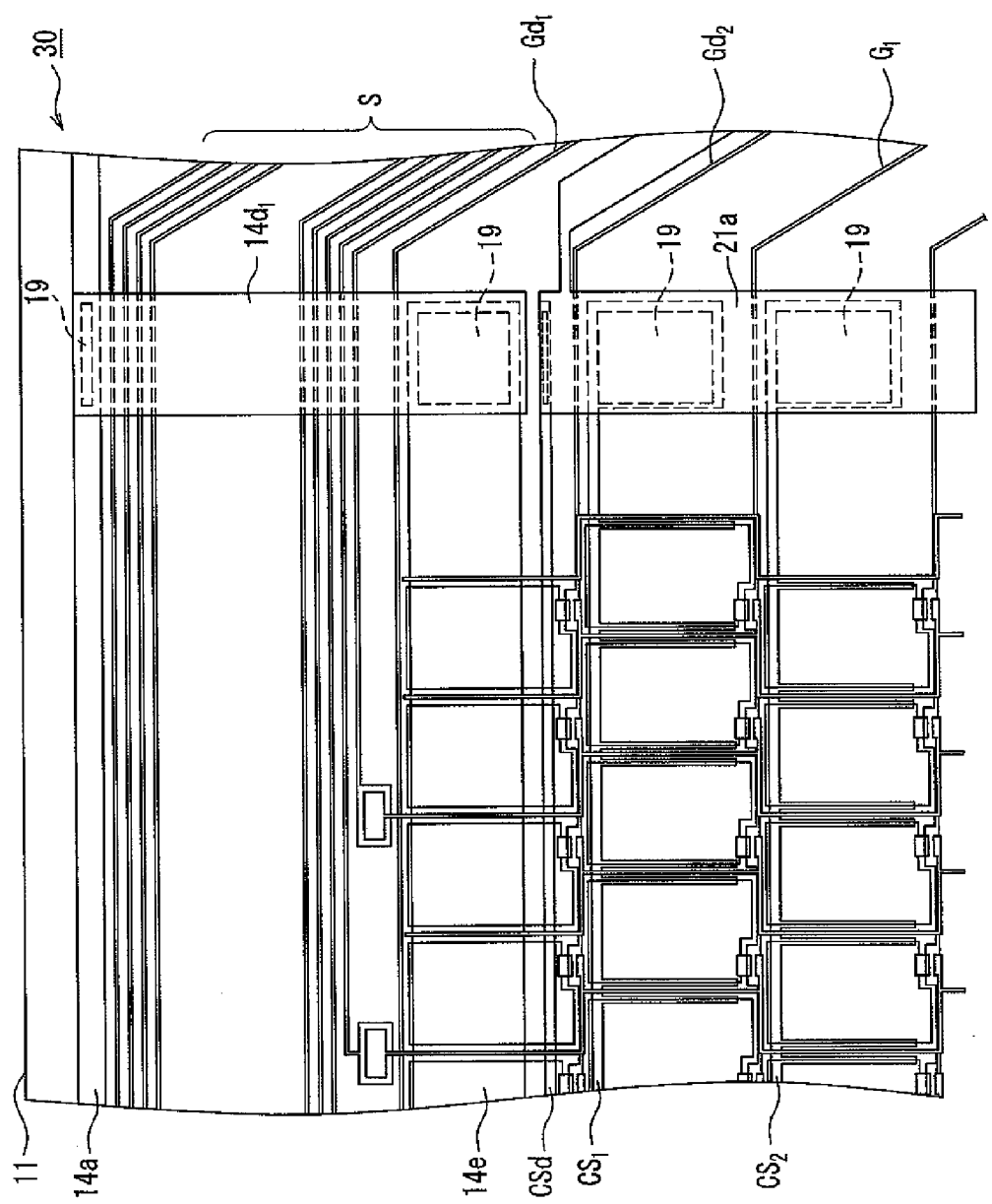
FIG. 9 is an enlarged plan view showing inside and the vicinity of the circle-A in FIG. 8.

FIG. 8 is a plan view showing a schematic constitution of an active matrix substrate 30 of a liquid crystal display device according to a preferred embodiment of the present invention. FIG. 9 is an enlarged plan view showing inside and the vicinity of the circle-A in FIG. 8. Components similar to those having been explained in the above-described preferred embodiments are provided with the same reference signs as in the preferred embodiments in order to avoid duplicated explanations.

As shown in FIGS. 8 and 9, the active matrix substrate 30 according to the present preferred embodiment is similar to the counterparts in the first and second preferred embodiments in that the common wirings 14a and 14b are provided in the frame region 13 in parallel or substantially parallel to the signal lines S and that the common wirings 14e, 14f are provided in the dummy picture element region of the pixel region 12, which serves to decrease the width of the frame region 13.

The third preferred embodiment is different from the first preferred embodiment but the same as the second preferred embodiment in that common wirings $14c_1$ and $14d_1$ connect the common wiring 14a to the common wiring 14e so as to form a closed loop electrically, and that common wirings $14c_2$ and $14d_2$ connect the common wiring 14b to the common wiring 14f so as to form a closed loop electrically.

The present preferred embodiment is different from the second preferred embodiment in that an auxiliary capacity wiring $CS_d$ is arranged together with the common wirings 14e, 14f in the dummy picture element region of the pixel region 12. By arranging the auxiliary capacity wiring $CS_d$ in the dummy picture element region in this manner, the resistance of the entire auxiliary wirings can be decreased, thereby preventing lowering of the voltage to be applied to the auxiliary capacity wirings $CS_1$, $CS_2$, . . . .

In the present preferred embodiment, the pixel electrode 17d and the TFT 18d are not essential elements. That is, a pixel electrode is not necessarily formed in the dummy picture element region. In an alternative constitution, the dummy picture element region has no TFT, and the pixel electrode 17d of the dummy picture element region is connected to at least one of the auxiliary capacity wiring $CS_d$ and the common wirings 14e, 14f.

Fourth Preferred Embodiment

Figure 10:
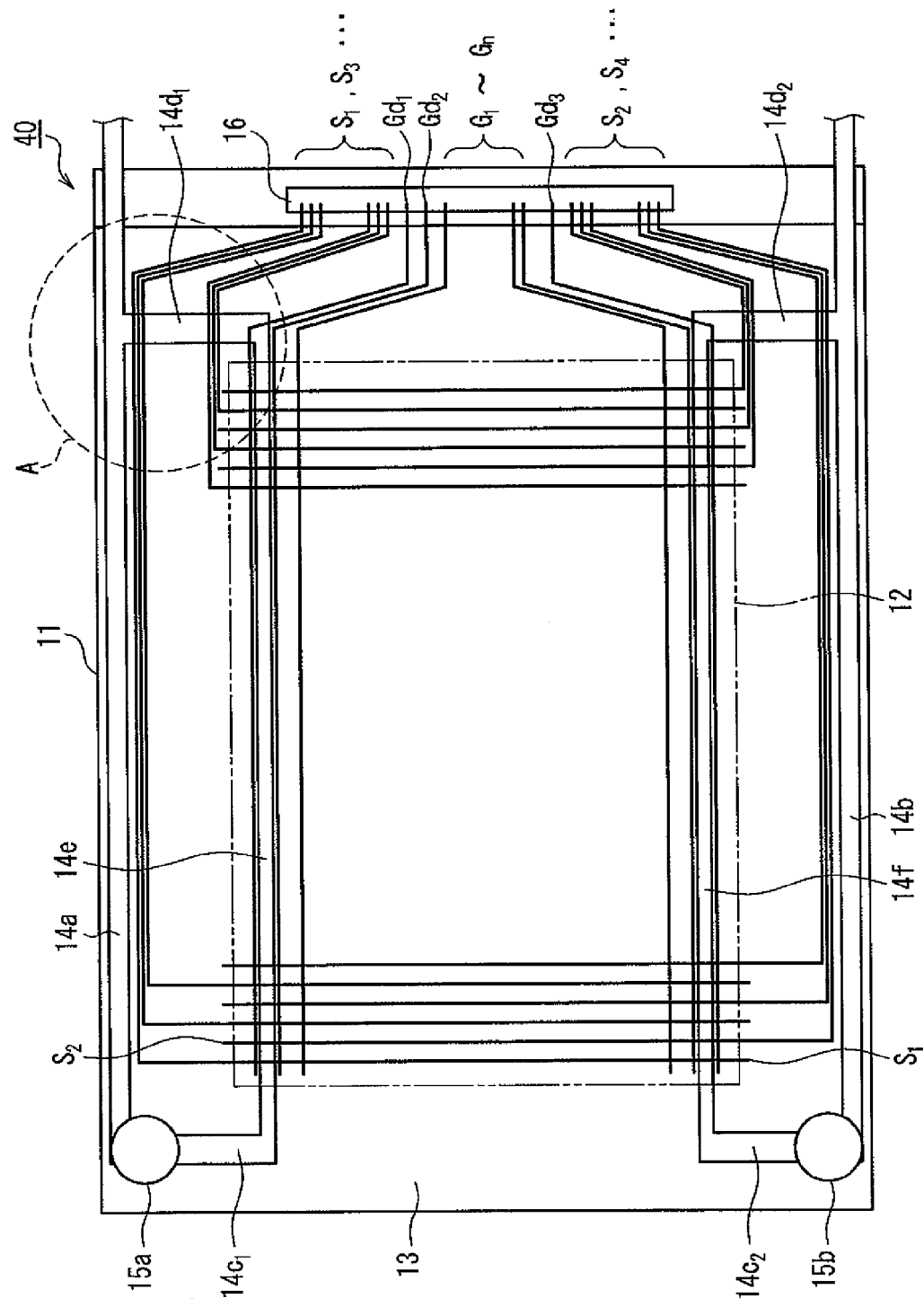
FIG. 10 is a plan view showing a schematic constitution of an active matrix substrate of a liquid crystal display device according to another preferred embodiment of the present invention.
Figure 11:
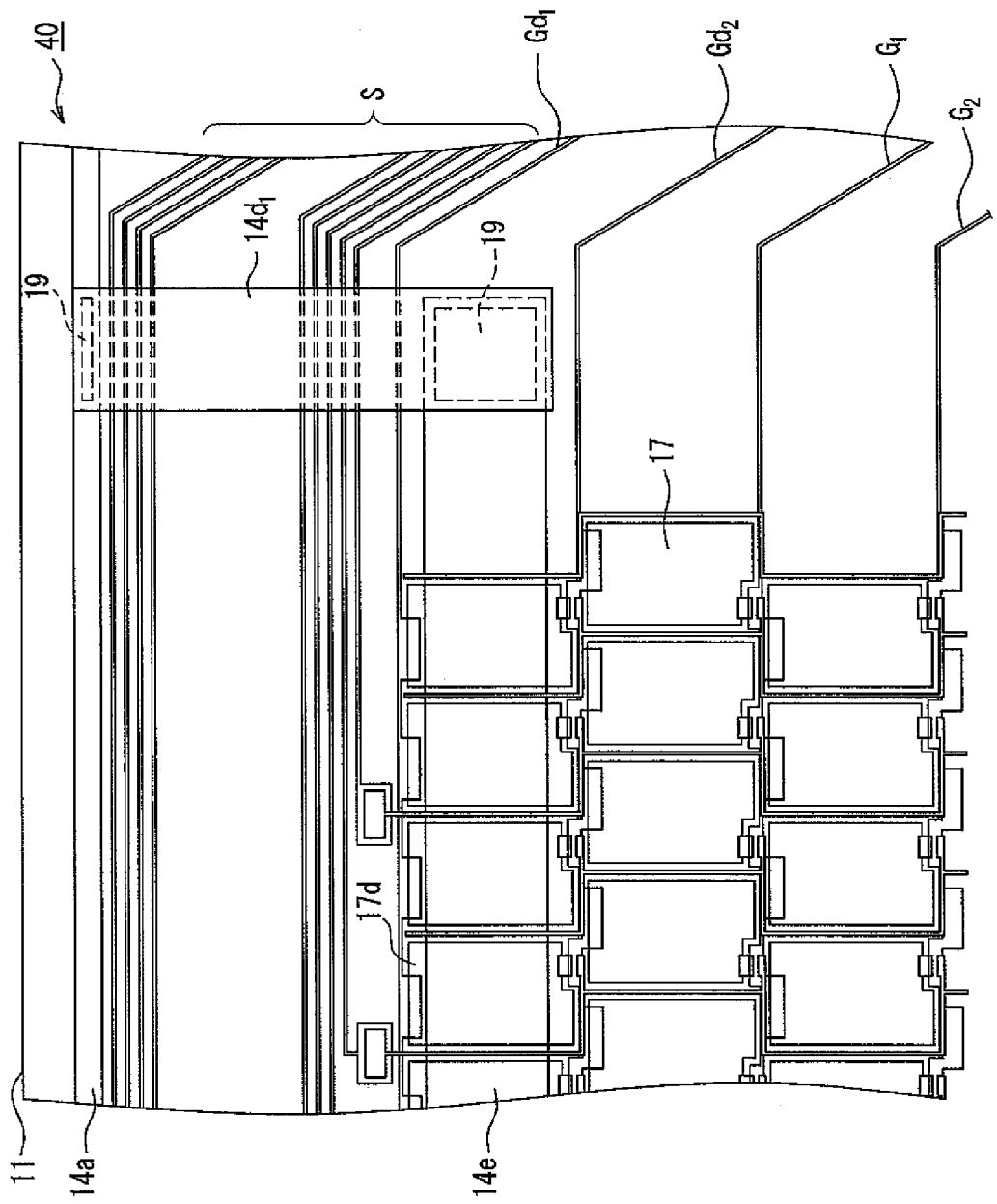
FIG. 11 is an enlarged plan view showing inside and the vicinity of the circle-A in FIG. 10.

FIG. 10 is a plan view showing a schematic constitution of an active matrix substrate 40 of a liquid crystal display device according to a preferred embodiment of the present invention. FIG. 11 is an enlarged plan view showing inside and the vicinity of the circle-A in FIG. 10. Components similar to those having been explained in the above-described preferred embodiments are provided with the same reference signs as in the preferred embodiments in order to avoid duplicated explanations.

As shown in FIGS. 10 and 11, the active matrix substrate 40 according to the present preferred embodiment is similar to the counterparts in the first and second preferred embodiments in that the common wirings 14a and 14b are provided in the frame region 13 in parallel or substantially parallel to the signal lines S and that the common wirings 14e, 14f are provided in the dummy picture element region of the pixel region 12, which serves to decrease the width of the frame region 13.

The fourth preferred embodiment is different from the first embodiment but the same as the second preferred embodiment in that common wirings $14c_1$ and $14d_1$ connect the common wiring 14a to the common wiring 14e so as to form a closed loop electrically, and that common wirings $14c_2$ and $14d_2$ connect the common wiring 14b to the common wiring 14f so as to form a closed loop electrically.

Figure 12:
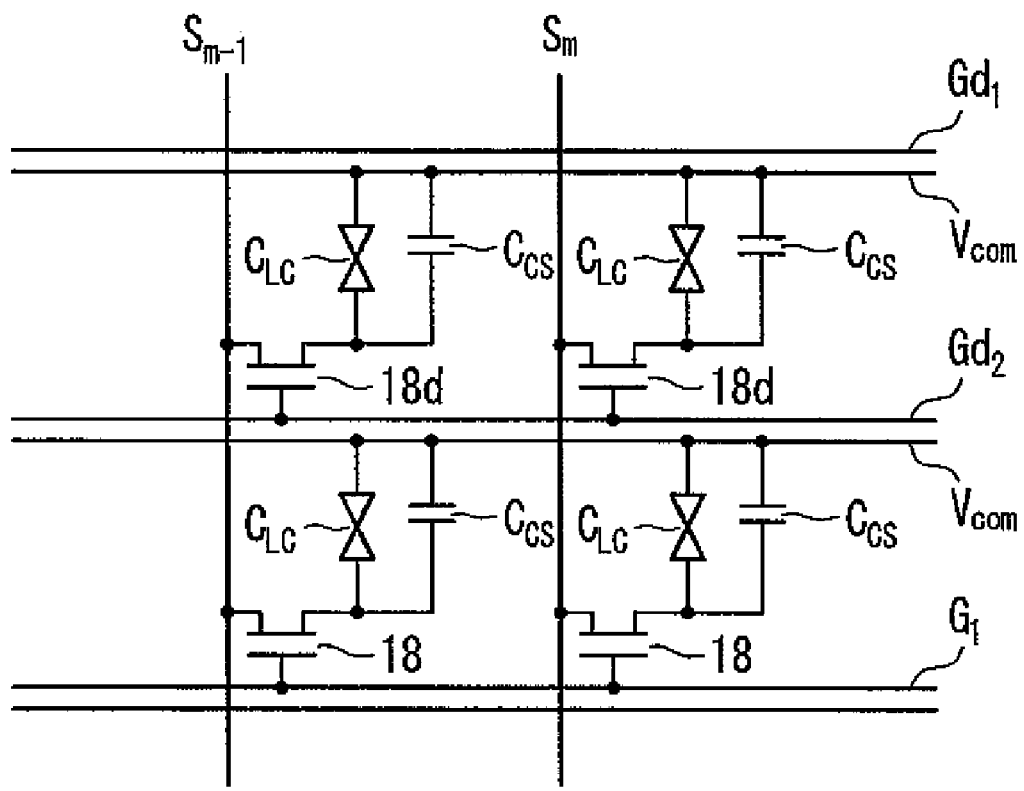
FIG. 12 is an equivalent circuit diagram of a dummy picture element region and an actual picture element region in the vicinity of the dummy picture element region.

FIG. 12 is an equivalent circuit diagram showing a dummy picture element region and an actual picture element region in the vicinity thereof. As shown in FIG. 12, in a liquid crystal display device according to the present preferred embodiment, auxiliary capacitors $C_{CS}$ are formed by using the scanning lines of the adjacent pixels. Therefore, unlike the first and second preferred embodiments, the active matrix substrate 40 according to the present preferred embodiment does not have any auxiliary capacity wirings.

As shown in FIG. 10, in the active matrix substrate 40, each of the pixel electrode 17 and the pixel electrode 17d forms an auxiliary capacitor $C_{CS}$ with a scanning line positioned above by one step in both the actual picture element region and the dummy picture element region. For example, the pixel electrode 17 of a picture element connected to the scanning line $G_1$ forms an auxiliary capacitor $C_{CS}$ with a dummy scanning line $G_{d2}$ positioned above the scanning line $G_1$ by one step.

Fifth Preferred Embodiment

Figure 13:
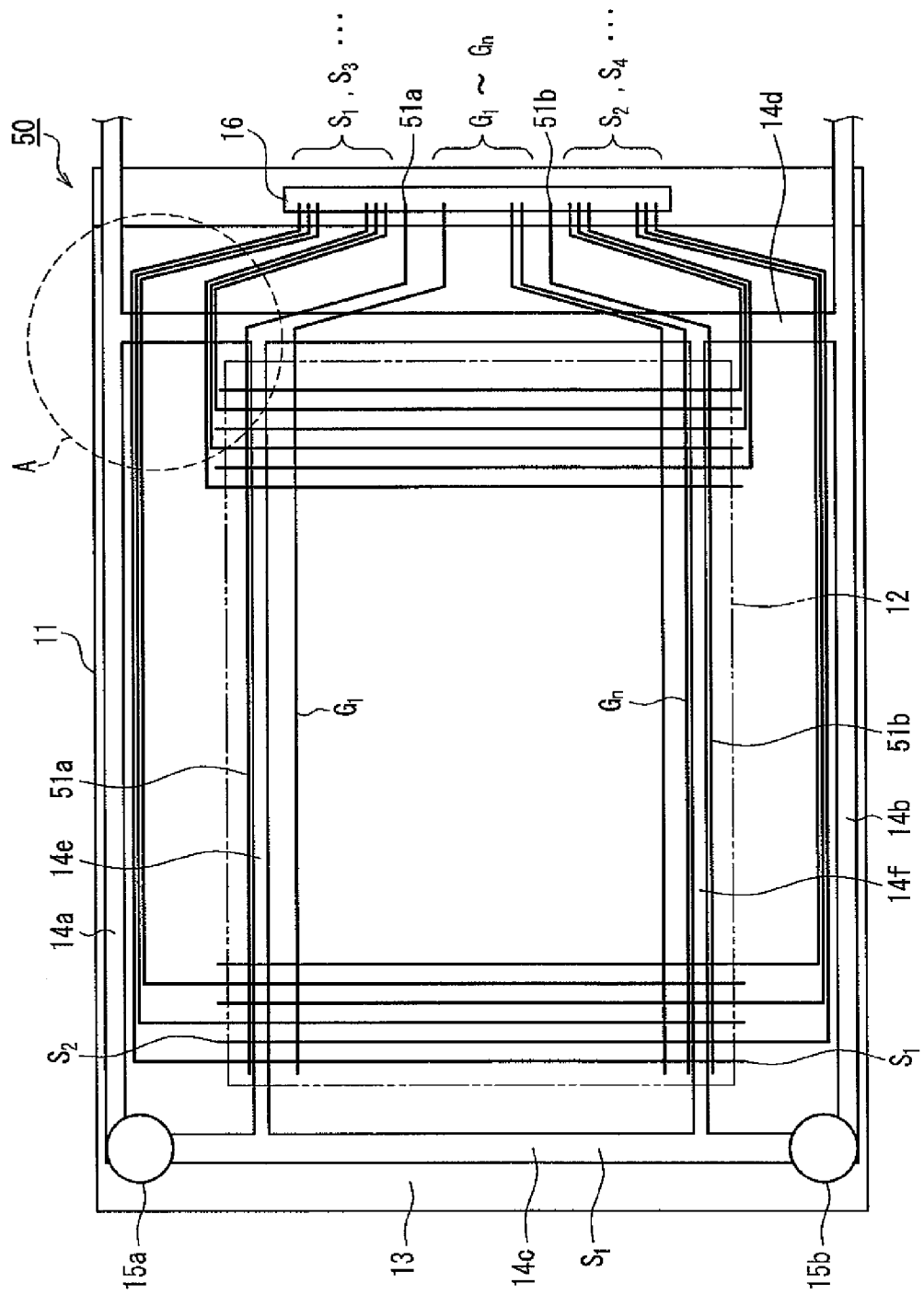
FIG. 13 is a plan view showing a schematic constitution of an active matrix substrate of a liquid crystal display device according to another preferred embodiment of the present invention.
Figure 14:
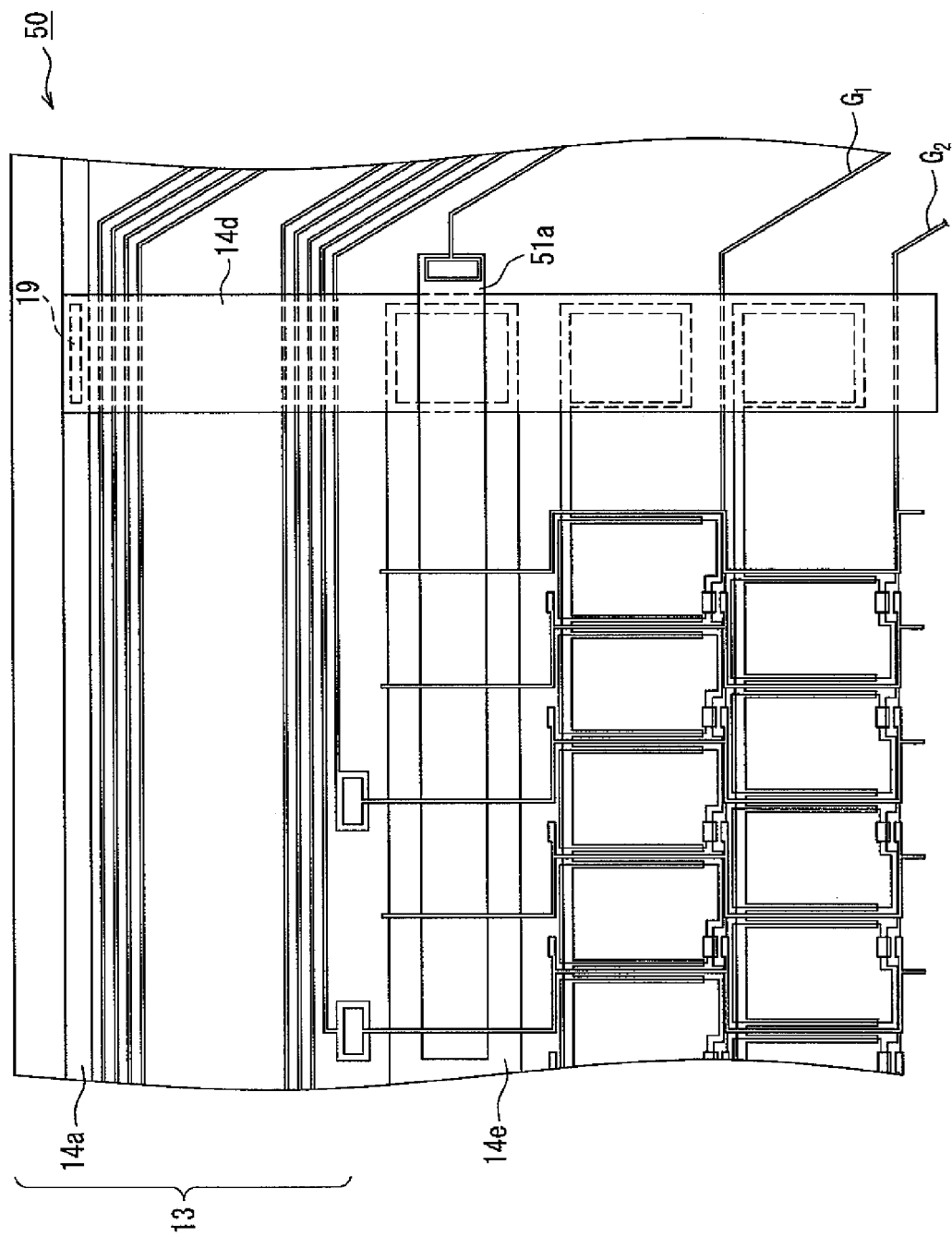
FIG. 14 is an enlarged plan view showing inside and the vicinity of the circle-A in FIG. 13.

FIG. 13 is a plan view showing a schematic constitution of an active matrix substrate 50 of a liquid crystal display device according to a preferred embodiment of the present invention. FIG. 14 is an enlarged plan view showing inside and the vicinity of the circle-A in FIG. 13. Components similar to those having been explained in the above-described preferred embodiments are provided with the same reference signs as in the embodiments in order to avoid duplicated explanations.

Unlike any of the first to fourth preferred embodiments, the active matrix substrate 50 according to the present preferred embodiment does not have a dummy picture element region. Instead, the active matrix substrate 50 has a trap wiring 51a and 51b outside (frame region side) the scanning line $G_1$ and also outside (frame region side) the scanning line $G_n$ as shown in FIGS. 13 and 14, for trapping ionic impurities in the liquid crystal.

When rubbing an oriented film during a process for manufacturing a liquid crystal display device, the oriented film scraped off from the substrate due to the friction may adhere as a foreign substance to the surface of the oriented film and diffused as ionic impurities into the liquid crystal over time. The trap wirings 51a and 51b are applied with a predetermined voltage (for example, −5 V) so as to have a function of trapping the ionic impurities. Thereby, display irregularities caused by diffusion of the ionic impurities into the actual picture element region can be prevented. The trap wirings 51a, 51b are formed of a material of the transparent electrode (ITO or IZO) like the pixel electrode or a material of the wirings (for example, Al or Mo) like the scanning lines G or the signal lines S.

Figure 15A:
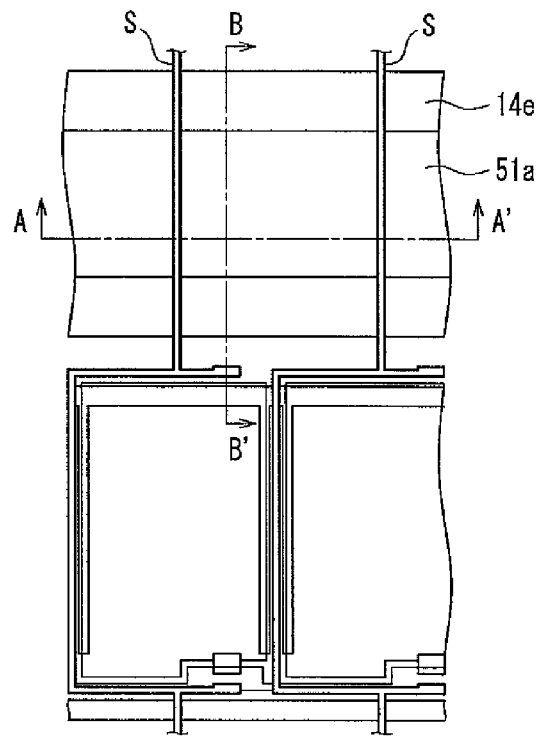
Figure 15B:
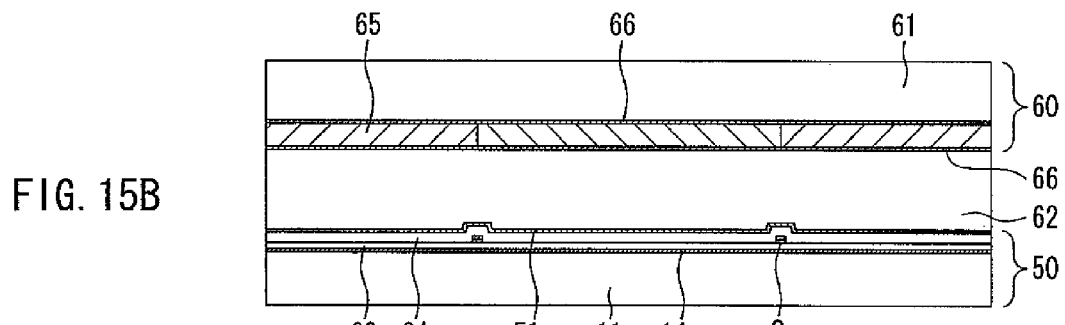
Figure 15C:
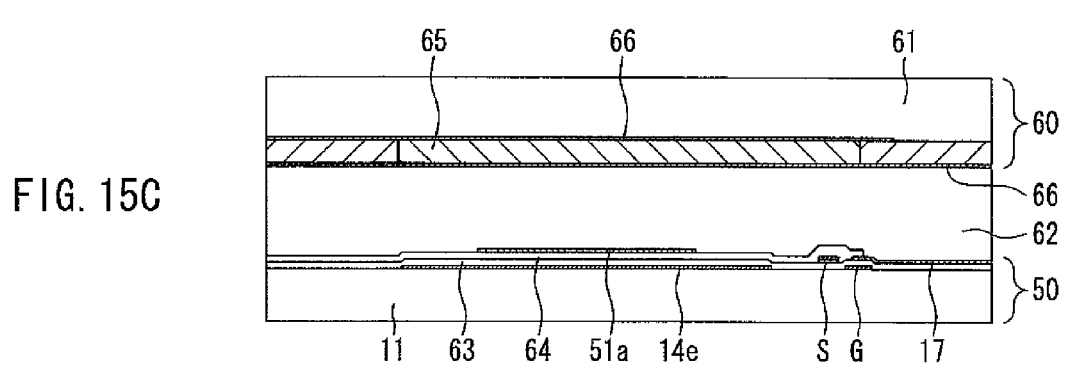

In the active matrix substrate 50, common wirings 14e and 14f are arranged in the lower layer of the trap wirings 51a, 51b. FIGS. 15A-15C shows the structure of a liquid crystal display device according to the present preferred embodiment. FIG. 15A is a plan view showing the positions of cross sections; FIG. 15B is a cross-sectional view showing the constitution of the liquid crystal display device taken along the line A-A' in FIG. 16A; and FIG. 15C is a cross-sectional view showing the constitution of the liquid crystal display device taken along the line B-B' in FIG. 16A. The oriented film is not shown in FIGS. 15B and 11C. Though FIG. 15A-15C show only the cross-sectional structure of the trap wiring 61a, these figures can be applied also to the structure of the trap wiring 51b.

As shown in FIGS. 15B and 11C, the liquid crystal display device according to the present preferred embodiment has a liquid crystal 62 interposed between the active matrix substrate 50 and a counter substrate 60. As shown in FIG. 15B, a common wiring 14e, a first insulating film 63, signal lines S, a second insulating film 64, a trap wiring 51a, and an oriented film (not shown) are formed in this order on the surface of a translucent substrate 11 of the active matrix substrate 50. Similarly, a black matrix 66, a color filter 65, a common electrode 66 and an oriented film (not shown) are formed on the surface of a translucent substrate 61 of the counter substrate 60. The black matrix 66 on the counter substrate 66 is arranged to cover the trap wiring 51a.

Further, as shown in FIG. 15C, the common wiring 14e is formed on the surface of the translucent substrate 11 of the active matrix substrate 50. And the first insulating film 63, the second insulating film 64 and the trap wiring 51a are formed thereon. Though the width of the common wiring 14e in the constitution shown in FIGS. 15A-15C is greater than the width of the trap wiring 51a, the common wirings 14e and 14f can be narrower than the trap wirings 51a, 51b. It should be noted that, however, the widths of the common wirings 14a, 14b can be decreased as the widths of the common wirings 14e, 14f are increased, thereby reducing the size of the frame region 13.

Figure 16:
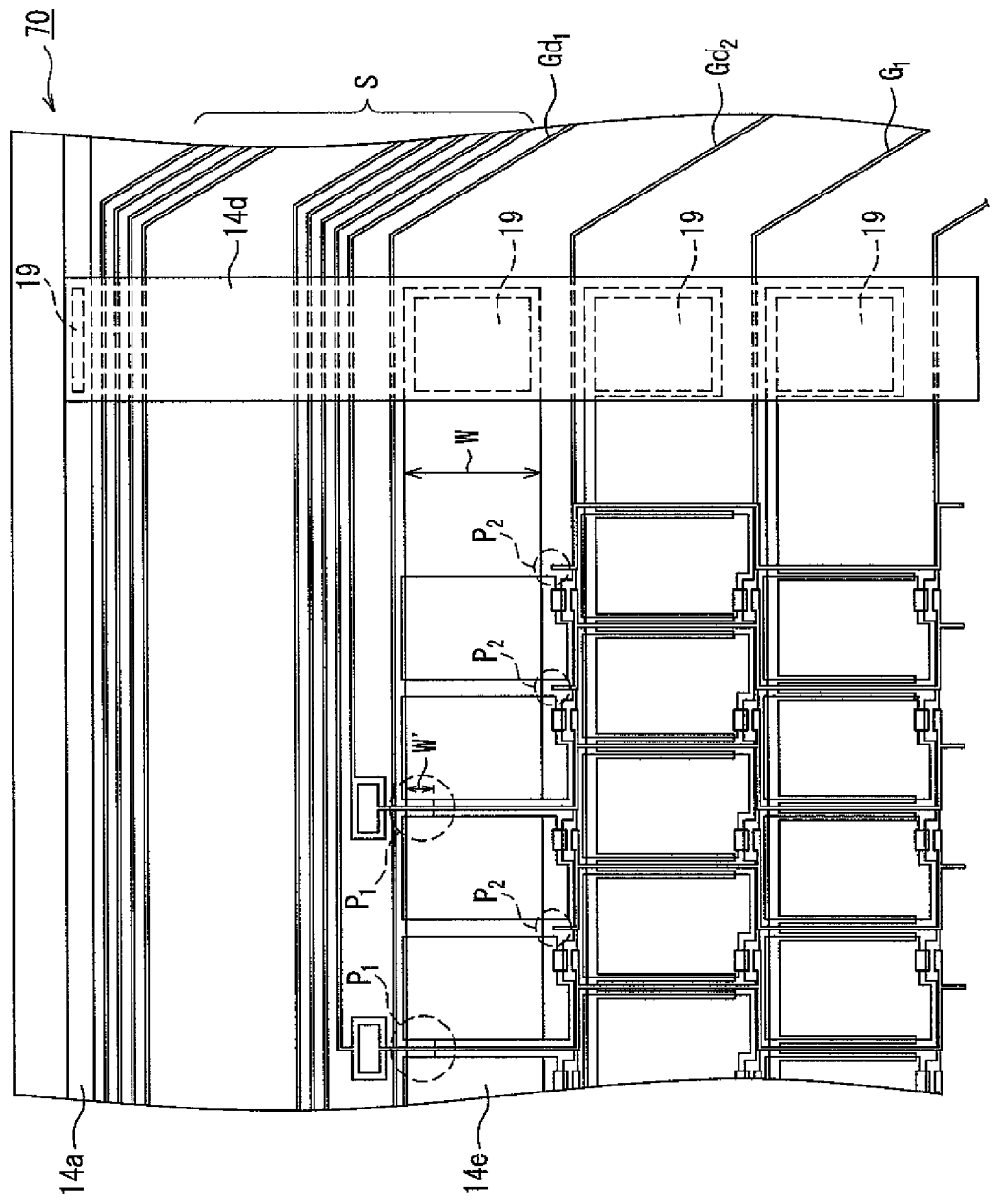
FIG. 16 is a plan view showing a constitution of an active matrix substrate according to a variation of preferred embodiments of the present invention.
Figure 17:
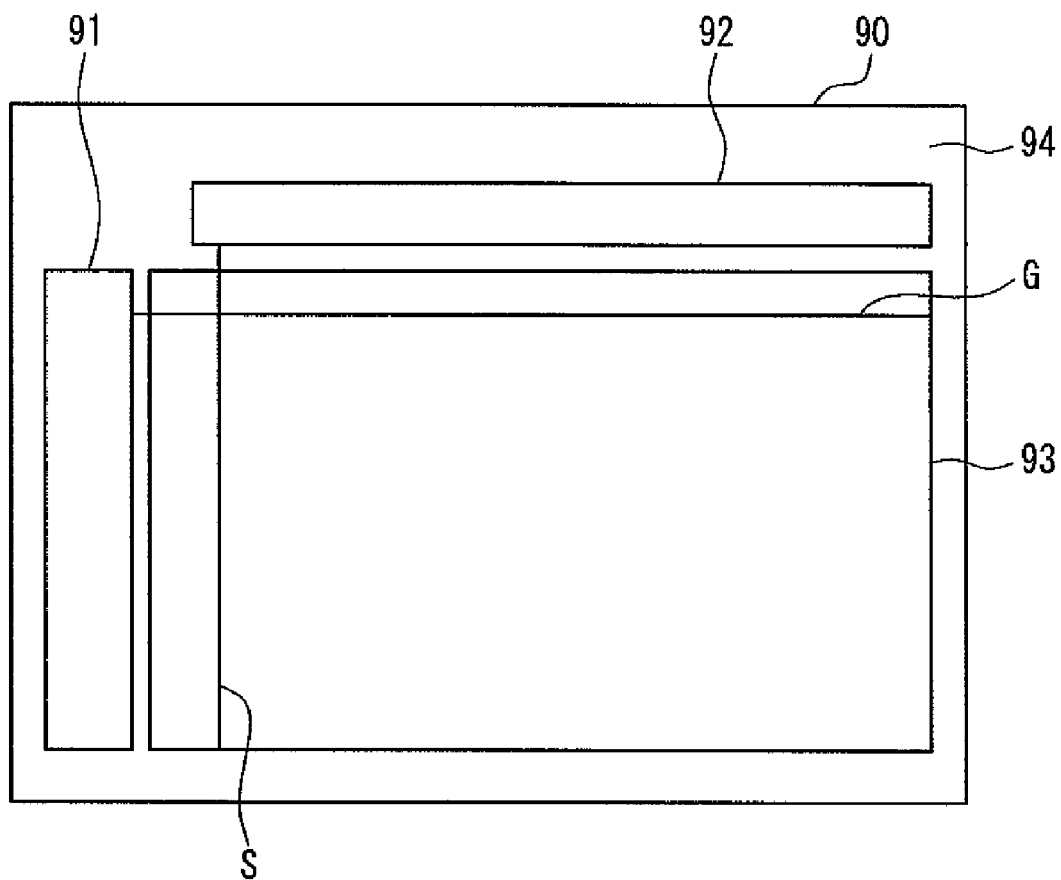
FIG. 17 is a plan view showing a constitution of an active matrix substrate of a conventional display device.

In addition to the above-described first to fifth preferred embodiments, variations of these embodiments will be described below. FIG. 16 is a plan view showing a constitution of an active matrix substrate 70 according to a variation of a preferred embodiment of the present invention, specifically, a variation of the first preferred embodiment. In FIG. 16, as shown in the circular regions $P_1$, the common wiring 14e provided in the dummy picture element region of the pixel region 12 of the active matrix substrate 70 is formed preferably to be narrower at the portion crossing the signal lines S than the general width W. Similarly, the common wiring 14f is formed preferably so that the width W' of a portion crossing the signal lines S to be narrower than the general width W. Thereby, the load imposed on the signal lines S can be decreased to feed an appropriate voltage to the pixel electrode. This is effective also in lowering the risk of short circuit between the signal lines S and the common wiring 14e, which is caused by pinholes or the like in the insulating films. Though FIG. 16 shows an example of variation of the first preferred embodiment, similar effects can be obtained by using any of the active matrix substrates according to the second to fifth preferred embodiments, by forming the common wiring 14e provided in the pixel region 12 so that the width of the part crossing the signal lines S will be narrower than the general width W. In the third preferred embodiment, similar effects can be obtained by forming the auxiliary capacity wiring $CS_d$ provided in the dummy picture element region so that the width of a portion crossing the signal lines S to be narrower than the general width W.

Further, as indicated in the circular regions $P_2$, in the active matrix substrate 70, it is preferable that the end of the signal lines S opposite to the signal input side is prevented from crossing the common wiring 14e provided in the dummy picture element region of the pixel region 12. Thereby, the load imposed on the signal lines S can be decreased to feed an appropriate voltage to the pixel electrode, and a short circuit between the signal lines S and the common wiring 14e, which is caused by pinholes or the like in the insulating films, can be prevented. Similarly, the common wiring 14f is arranged preferably not to cross the end portions of the signal lines S opposite to the signal input side. Though FIG. 16 shows a variation of the first preferred embodiment, similar effects can be obtained by using the active matrix substrates according to any of the second to fifth preferred embodiments, by providing a constitution where the end portions of the signal lines S opposite to the signal input side do not cross the common wiring 14e provided in the dummy picture element region of the pixel region 12. In the third preferred embodiment, it is preferable that the auxiliary capacity wiring $CS_d$ in the dummy picture element region is arranged not to cross the signal lines S at the end portions opposite to the signal input side.

Each of the preferred embodiments mentioned above is just a specific example of the present invention, and the preferred embodiments can be modified within the scope of the present invention. For example, FIG. 2 or the like shows a constitution where the scanning line is parallel or substantially parallel to the long side of the active matrix substrate; the scanning line can be parallel or substantially parallel to the short side of the active matrix substrate.

Though FIG. 2 or the like shows an example where the picture elements are disposed in a delta arrangement, the picture elements can be disposed in a stripe arrangement.

The numbers of the dummy scanning line are not limited to three as in the above examples, but the numbers can be increased. Thereby, when a plurality of lines of the dummy picture element regions are formed, the common wirings and the auxiliary capacity wirings (in the third preferred embodiment) can be arranged in only one row of the dummy pixel region. Alternatively, the common wirings and the auxiliary capacity wirings (in the third preferred embodiment) can be arranged in a plurality of rows of the dummy picture element regions.

When the present invention is practiced as a liquid crystal display device, there is no particular limitation on the display mode of the liquid crystal, existence of a backlight and the like. The present invention can be applied to a liquid crystal display device of an arbitrary mode such as transparent, reflective, or semitransparent.

The present invention can be used for industrial application such as an active matrix substrate having a bus line drive circuit arranged on one side of a frame region and feeding a common voltage $V_{com}$ to a side of a counter substrate via a common transfer, and also as a display device using the active matrix substrate.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
   an active matrix substrate including scanning lines and signal lines arranged in a matrix, and a pixel region including an actual pixel region including effective pixels arranged to perform a display in accordance with a data signal supplied by the signal lines, and a dummy pixel region positioned at the panel end side as compared to the actual pixel region, the dummy pixel region including at least one dummy pixel with a dummy pixel electrode;
   a counter substrate;
   a bus line drive circuit that is arranged on one side of the active matrix substrate and outside the pixel region and to supply a scanning signal and a data signal to the scanning lines and the signal lines, respectively; and
   a common drive circuit arranged to generate a common signal to be supplied to a common electrode of the counter substrate; wherein
   the active matrix substrate includes:
      an auxiliary capacitor that is arranged in the pixel region;
      an auxiliary capacity wiring that is arranged in the pixel region and that is electrically connected to the auxiliary capacitor;
      a common transfer that is provided on a side facing the side of the active matrix substrate on which the bus line drive circuit is arranged and to supply the common signal to the common electrode of the counter substrate; and
      a common wiring arranged to supply the common signal to the common transfer;
   at least one portion of the common wiring is arranged in the dummy pixel region of the pixel region such that a portion of the common wiring is arranged to overlap the dummy pixel electrode of the at least one dummy pixel and no portion of the common wiring is arranged in the actual pixel region to overlap any of the effective pixels;
   the dummy pixel region further includes a dummy scanning line that is parallel or substantially parallel to the scanning lines and the dummy pixel, which is connected to the dummy scanning line and which does not contribute to performing the display; and
   the at least one portion of the common wiring that is arranged in the dummy pixel region has a width that is larger than a width of the auxiliary capacity wiring.

2. The display device according to claim 1, wherein the at least one portion of the common wiring arranged in the dummy pixel region is connected electrically to the auxiliary capacity wiring in the pixel region.

3. The display device according to claim 1, wherein the at least one portion of the common wiring arranged in the dummy pixel region is independent electrically from the auxiliary capacity wiring in the pixel region.

4. The display device according to claim 1, further comprising a dummy auxiliary capacity wiring in the dummy pixel region, arranged substantially parallel to the auxiliary capacity wiring in the pixel region.

5. The display device according to claim 4, wherein a width of the auxiliary capacity wiring is narrower at a portion crossing the signal lines as compared to a general width of the common wiring.

6. The display device according to claim 4, wherein end portions of the signal lines opposite to the signal input side are arranged not to cross the dummy auxiliary capacity wiring.

7. The display device according to claim 1, wherein the pixel electrode in the actual pixel region defines the auxiliary capacitor with a scanning line adjacent to a scanning line that drives the pixel electrode.

8. The display device according to claim 1, wherein a width of the at least one portion of the common wiring arranged in the dummy pixel region is narrower at a portion crossing the signal lines as compared to the general width of the common wiring.

9. The display device according to claim 1, wherein end portions of the signal lines opposite to the signal input side are arranged not to cross the at least one portion of the common wiring arranged in the dummy pixel region.

10. The display device according to claim 1, further comprising a shielding member arranged to visually shield the dummy pixel region.

11. The display device according to claim 1, further comprising a liquid crystal interposed between the active matrix substrate and the counter substrate.

* * * * *